(12) United States Patent
Dong et al.

(10) Patent No.: US 12,229,968 B2
(45) Date of Patent: Feb. 18, 2025

(54) TRAJECTORY DATA PROCESSING METHOD AND DEVICE, AND STORAGE MEDIUM

(71) Applicant: TENCENT TECHNOLOGY (SHENZHEN) COMPANY LIMITED, Shenzhen (CN)

(72) Inventors: Hao Dong, Shenzhen (CN); Shufeng Gao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 795 days.

(21) Appl. No.: 17/394,389

(22) Filed: Aug. 4, 2021

(65) Prior Publication Data
US 2021/0366130 A1    Nov. 25, 2021

Related U.S. Application Data

(63) Continuation of application No. PCT/CN2020/096747, filed on Jun. 18, 2020.

(30) Foreign Application Priority Data

Jul. 29, 2019   (CN) .......................... 201910690467.6

(51) Int. Cl.
G06T 7/20   (2017.01)
(52) U.S. Cl.
CPC ...... *G06T 7/20* (2013.01); *G06T 2207/20221* (2013.01); *G06T 2207/30241* (2013.01)
(58) Field of Classification Search
CPC ............ G01C 21/3819; G01C 21/3841; G01C 21/3878; G06T 11/60; G06T 17/05;
(Continued)

(56) References Cited

U.S. PATENT DOCUMENTS

| | | | | |
|---|---|---|---|---|
| 8,694,241 | B1* | 4/2014 | Kadous ................ | G08G 1/0112 701/422 |
| 2018/0091439 | A1* | 3/2018 | Zhang .................... | G08G 1/081 |

(Continued)

FOREIGN PATENT DOCUMENTS

| CN | 102332210 A | 1/2012 |
|---|---|---|
| CN | 105808912 A | 7/2016 |

(Continued)

OTHER PUBLICATIONS

"ENVI EX User's Guide." 2009, pp. 1-275. http://manualzz.com/doc/32617490/envi-ex-user-s-guide. (Year: 2009).*

(Continued)

*Primary Examiner* — Michael J Vanchy, Jr.
(74) *Attorney, Agent, or Firm* — ANOVA LAW GROUP PLLC

(57) ABSTRACT

A trajectory data processing method is provided to a trajectory data apparatus. The method includes: obtaining trajectory data in a target geographical range, the trajectory data including moving trajectories of a plurality of moving objects, generating a feature map layer of the trajectory data, the feature map layer at least including a trajectory flow map layer, a moving speed map layer, and a travel direction map layer, fusing map layers in the feature map layer to obtain a fused feature map layer; displaying the fused feature map layer; and in response to obtaining a selection instruction of any pixel position on the fused feature map layer, displaying a trajectory flow at the pixel position and a moving speed and a travel direction of a moving object at the pixel position.

20 Claims, 13 Drawing Sheets

(58) Field of Classification Search
CPC . G06T 2207/20221; G06T 2207/30241; G06T 7/20
See application file for complete search history.

(56) References Cited

U.S. PATENT DOCUMENTS

2019/0072966 A1* 3/2019 Zhang ................. G08G 1/161
2022/0081028 A1* 3/2022 Kvieska .......... B60W 30/18145

FOREIGN PATENT DOCUMENTS

| CN | 106157624 A | 11/2016 |
|---|---|---|
| CN | 110428500 A | 11/2019 |

OTHER PUBLICATIONS

Niels Willems et al,, "Visualization o Vessel Movements", Jul. 27, 2009, pp. 959-966, vol. 28 No. 3, Computer Graphics Forum: Jornal of the European Association For Computer Graphics.
"ENVI EX User's Guide." 2009, pp. 1-275. http://manualzz.com/doc/32617490/envi-ex-user-s-guide.
Gennady Andrienko et al., "Spatio-temporal Aggregation for Visual Analysis of Movements", 2008, Visual Analytics Science And Technology.
The European Patent Office (EPO) Extended Search Report for EP Application No. 20848404. Sep. 22, 2022 8 Pages.
The World Intellectual Property Organization (WIPO) International Search Report for PCT/CN2020/096747 Jul. 30, 2020 7 Pages (including translation).
Shengce Wang, "Design of an Visualization Solution for Analyzing Spatio-Temporal Cycling Trajectory Data: A Case-Study of the Fietstelweek and Bikeprint," China Master's Theses Full-Text Database, Engineering Science & Technology II, Feb. 15, 2018 (Feb. 15, 2018). 96 pages.
Qiang Gao et al., "Trajectory Big Data: A Review of Key Technologies in Data Processing," Journal of Software, vol. 28, No. 4, Apr. 2017. 34 pages.
Ming-Qi LV, "Research on the semantic location-aware computing based on trajectory data mining," Zhejiang University 2012 doctoral dissertation, Jan. 2012. 163 pages.
Yanjun Chen, "Research on Clustering Algorithms for Massive Trajectory Data," Beijing Jiaotong University 2015 Master Thesis, Jun. 2015. 81 pages.
Yu Zheng, "Trajectory Data Mining: An Overview," Microsoft Research, ACM Trans. On Intelligent Systems and Technology, vol. 6, No. 3, Article 1, Pub. date: Sep. 2015. 41 pages.
Jianming LV et al., "Modeling Trajectory as Image: Convolutional Neural Networks for Multi-scale Taxi Trajectory Prediction," arXiv:1611.07635, Mar. 15, 2017. 15 pages.

* cited by examiner

TRAJECTORY DATA PROCESSING METHOD AND DEVICE, AND STORAGE MEDIUM

RELATED APPLICATION(S)

This application is a continuation application of PCT Patent Application No. PCT/CN2020/096747, filed on Jun. 18, 2020, which claims priority to Chinese Patent Application No. 201910690467.6, entitled "TRAJECTORY DATA PROCESSING METHOD AND APPARATUS, STORAGE MEDIUM, AND DEVICE" filed on Jul. 29, 2019, all of which are incorporated by reference in entirety.

FIELD OF THE TECHNOLOGY

The present disclosure relates to the field of network technologies, and in particular, to a trajectory data processing method and device, and a storage medium.

BACKGROUND

Trajectory data refers to data information formed by sampling motion processes of one or more moving objects. Taking a road network as an example, the moving objects generally refer to vehicles. With rapid development of the network technologies, collecting the trajectory data and processing the collected trajectory data, for example, analyzing the trajectory data through a trajectory modeling method is a way of researching the trajectory data and mining a motion mode of the moving object in the real world.

Upon collection of the trajectory data, the related art only relates to simply processing the trajectory data. For example, a trajectory is regarded as a three-dimensional (3D) folding line formed by motion of the moving object in time-space, where the folding line includes a series of position points arranged according to the time; then the folding line is projected at a fixed spatial scale to obtain a sampling position sequence, for example, defining the trajectory as a simple sampling position sequence; and in the subsequent process, performing a further deep analysis based on the sampling position sequence, for example, performing trajectory mining.

The trajectory data processing mode above may only relates to simply converting the trajectory into the sampling position sequence; the mode is simple; moreover, the trajectory data generally implies rich feature information, for example, rich deep-level knowledge of the road network, and therefore, the trajectory data processing mode would cause severe loss of the feature information of the trajectory data, which may not readily mine the motion mode of the moving object in the real world, and would further severely influence the subsequent trajectory mining effect. In this regard, how to better process the trajectory data is yet to be solved.

SUMMARY

Embodiments of the present disclosure provide a trajectory data processing method and device, and a storage medium, which have a good trajectory modeling effect thereof, can mine the motion mode of the moving object in the real world with enhanced precision, and ensures the subsequent trajectory mining effect. The technical solutions are as follows:

In one aspect, the present disclosure provides a trajectory data processing method, applied or applicable to a trajectory data processing device. The method includes: obtaining trajectory data in a target geographical range, the trajectory data including moving trajectories of a plurality of moving objects; generating a feature map layer of the trajectory data, the feature map layer at least including a trajectory flow map layer, a moving speed map layer, and a travel direction map layer; fusing map layers in the feature map layer to obtain a fused feature map layer; displaying the fused feature map layer; and in response to obtaining a selection instruction of any pixel position on the fused feature map layer, displaying a trajectory flow at the pixel position and a moving speed and a travel direction of a moving object at the pixel position.

In another aspect, the present disclosure provides a trajectory data processing method, applied or applicable to a trajectory data processing device. The method includes: displaying a feature map layer, the feature map layer at least including a trajectory flow map layer, a moving speed map layer, and a travel direction map layer; in response to obtaining a selection instruction of any pixel position on the feature map layer, displaying a trajectory flow at the pixel position and a moving speed and a travel direction of a moving object at the pixel position.

In certain embodiments, in the feature map layer, different colors respectively represent the trajectory flow, the moving speed, and the travel direction.

In certain embodiments, the displaying a trajectory flow at the pixel position and a moving speed and a travel direction of a moving object at the pixel position includes: superimposing and displaying a feature display map layer on the feature map layer; and displaying, on the feature display map layer, the trajectory flow at the pixel position and the moving speed and the travel direction of the moving object at the pixel position.

In yet another aspect, the present disclosure provides a trajectory data processing apparatus. The apparatus includes: a first display module, configured to display a feature map layer, the feature map layer at least including a trajectory flow map layer, a moving speed map layer, and a travel direction map layer; and a second display module, configured to display, in response to obtaining a selection instruction of any pixel position on the feature map layer, a trajectory flow at the pixel position and a moving speed and a travel direction of a moving object at the pixel position.

In certain embodiments, in the feature map layer, different colors respectively represent the trajectory flow, the moving speed, and the travel direction.

In certain embodiments, the second display module is further configured to superimpose and display a feature display map layer on the feature map layer; and display, on the feature display map layer, the trajectory flow at the pixel position and the moving speed and the travel direction of the moving object at the pixel position.

In yet another aspect, the present disclosure provides a trajectory data processing apparatus. The apparatus includes: an obtaining module, configured to obtain trajectory data in a target geographical range, the trajectory data including moving trajectories of a plurality of moving objects; a generation module, configured to generate a feature map layer of the trajectory data, the feature map layer at least including a trajectory flow map layer, a moving speed map layer, and a travel direction map layer; a processing module, configured to fuse map layers in the feature map layer to obtain a fused feature map layer; and a display module, configured to display the fused feature map layer;

and display, in response to obtaining a selection instruction of any pixel position on the fused feature map layer, a trajectory flow at the pixel position and a moving speed and a travel direction of a moving object at the pixel position.

In certain embodiments, the display module is configured to superimpose and display a feature display map layer on the fused feature map layer; and display, on the feature display map layer, the trajectory flow at the pixel position and the moving speed and the travel direction of the moving object at the pixel position.

In certain embodiments, the apparatus further includes: a scaling module, configured to respectively scale each grid region into a trajectory image with a uniform size; and a conversion module, configured to, perform, for any grid region, coordinate system conversion on each moving trajectory included in each grid region, to obtain a pixel position of each sampling point on each moving trajectory in a corresponding trajectory image; where the grid region is obtained by spatially splitting the target geographical range, and each moving trajectory included in the trajectory data is divided according to the grid region to which the moving trajectory belongs.

In certain embodiments, the conversion module is configured to obtain longitude and latitude coordinates of a region boundary of the grid region; obtain a height value and a width value of a corresponding trajectory image; for any sampling point, obtain a horizontal axis coordinate of the sampling point in the corresponding trajectory image according to longitude and latitude coordinates of left and right boundaries of the grid region, the width value, and a longitude coordinate of the sampling point; and obtain a longitudinal axis coordinate of the sampling point in the corresponding trajectory image according to longitude and latitude coordinates of upper and lower boundaries of the grid region, the height value, and a latitude coordinate of the sampling point.

In certain embodiments, in response to the feature map layer including the trajectory flow map layer, the generation module is configured to, detect, for each pixel position in any trajectory image, based on a corresponding pixel position of each sampling point on each moving trajectory included in a corresponding grid region in the trajectory image, whether each of the moving trajectories is intersected with the pixel position; and when or in response to determining one of the moving trajectories is intersected with the pixel position, add one to a trajectory flow at the pixel position; where the trajectory flow map layer includes a trajectory flow of each pixel position in the trajectory image.

In certain embodiments, in response to the feature map layer including the moving speed map layer, the generation module is configured to, detect, for each pixel position in any trajectory image, based on a corresponding pixel position of each sampling point on each moving trajectory included in a corresponding grid region in the trajectory image, whether each of the moving trajectories is intersected with the pixel position; when or in response to determining one of the moving trajectories is intersected with the pixel position, accumulate the moving speeds of the sampling points having the pixel position on the moving trajectory; obtain an average moving speed based on a total number of the accumulated sampling points and a sum of the accumulated moving speeds; and in response to the average moving speed being smaller than a speed threshold, use the average moving speed as a moving speed of a moving object at the pixel position; where the moving speed map layer includes the moving speed of the moving object at each pixel position in the trajectory image.

In certain embodiments, in response to the feature map layer including the travel direction map layer, the generation module is configured to, detect, for each pixel position in any trajectory image, based on a corresponding pixel position of each sampling point on each moving trajectory included in a corresponding grid region in the trajectory image, whether each of the moving trajectories is intersected with the pixel position; and when or in response to determining one of the moving trajectories is intersected with the pixel position, accumulating vector directions of the sampling points having the pixel position on the moving trajectory; where the travel direction map layer includes a vector direction of each pixel position in the trajectory image, and the vector direction represents a travel direction of a moving object.

In certain embodiments, the display module is configured to display a historical trajectory flow at a geographical position corresponding to the pixel position and a historical average moving speed and a historical travel direction of the moving object at the geographical position corresponding to the pixel position.

In certain embodiments, the processing module is configured to perform flow feature processing on the trajectory flow map layer, to obtain a first feature map layer; project the moving speed of the moving speed map layer in a directional space based on the travel direction map layer, to obtain a second feature map layer; and splice and combine the first feature map layer and the second feature map layer to obtain the fused feature map layer; where the first feature map layer and the second feature map layer have the same value space.

In certain embodiments, the processing module is configured to obtain a flow value upper limit, a first smoothing factor, and a second smoothing factor; obtain a maximum trajectory flow in the trajectory flow map layer; and for any pixel position in the trajectory flow map layer, obtain the trajectory flow of the pixel position again based on the trajectory flow of the pixel position, the first smoothing factor, the second smoothing factor, the maximum trajectory flow, and the flow value upper limit.

In certain embodiments, the processing module is configured to, obtain, for any pixel position, in the moving speed map layer, the moving speed of the moving object at the pixel position; obtain a vector direction of the moving object at the pixel position in the travel direction map layer; use a product of the moving speed and a sine value of the vector direction as a moving speed of the pixel position in a longitudinal axis direction; and use a product of the moving speed and a cosine value of the vector direction as a moving speed of the pixel position in a horizontal axis direction.

In certain embodiments, the apparatus further includes: a pre-processing module, configured to, pre-process the trajectory data after obtaining the trajectory data; where the pre-processing includes at least one of the following steps: splitting the target geographical range into a plurality of grid regions according to spaces, and dividing each moving trajectory included in the trajectory data according to the grid region to which the moving trajectory belongs; filtering, according to a set filter condition, each moving trajectory included in the trajectory data; performing abnormality elimination processing on each moving trajectory included in the trajectory data; and performing data interpolation processing on each moving trajectory included in the trajectory data.

In yet another aspect, the present disclosure provides a non-transitory storage medium. The non-transitory storage medium stores at least one instruction, the at least one instruction being loaded and executed by a processor to perform obtaining trajectory data in a target geographical range, the trajectory data including moving trajectories of a plurality of moving objects; generating a feature map layer of the trajectory data, the feature map layer at least including a trajectory flow map layer, a moving speed map layer, and a travel direction map layer; fusing map layers in the feature map layer to obtain a fused feature map layer; displaying the fused feature map layer; and in response to obtaining a selection instruction of any pixel position on the fused feature map layer, displaying a trajectory flow at the pixel position and a moving speed and a travel direction of a moving object at the pixel position.

In yet another aspect, the present disclosure provides a trajectory data processing device. The device includes a processor and a memory, the memory storing at least one instruction; and the at least one instruction being loaded and executed by the processor to implement the following steps: obtaining trajectory data in a target geographical range, the trajectory data including moving trajectories of a plurality of moving objects; generating a feature map layer of the trajectory data, the feature map layer at least including a trajectory flow map layer, a moving speed map layer, and a travel direction map layer; fusing map layers in the feature map layer to obtain a fused feature map layer; displaying the fused feature map layer; and in response to obtaining a selection instruction of any pixel position on the fused feature map layer, displaying a trajectory flow at the pixel position and a moving speed and a travel direction of a moving object at the pixel position.

Technical improvement brought by the technical solutions provided in the embodiments of the present disclosure may be as follows:

After obtaining the trajectory data in the target geographical range, a feature map layer of the trajectory data is first generated, where the feature map layer at least includes a trajectory flow map layer, a moving speed map layer, and a travel direction map layer, that is, the embodiments of the present disclosure relate to modeling the trajectory data in a new 3D space, for example, the trajectory data is modeled as new 3D space data in three dimensions of flow, speed, and direction; and then, the map layers are fused to form a fused feature map layer and visualization analysis is further performed on the fused feature map layer.

That is, the embodiments of the present disclosure make a comprehensive consideration of attribute information of multiple dimensions including trajectory flow, moving speed, and travel direction in a trajectory modeling phase by means of multi-channel feature fusion, which effectively preserves important feature information implied in the trajectory data, and therefore, the embodiments of the present disclosure not only can mine a motion mode of the moving object in the real world with enhanced precision, but also can improve a subsequent trajectory mining effect.

In addition, after displaying the fused feature map layer, in response to obtaining a selection instruction of any pixel position on the fused feature map layer, the trajectory flow at the pixel position and the moving speed and the travel direction of the moving object at the pixel position can also be intuitively displayed, for example, the embodiments of the present disclosure can intuitively analyze the trajectory flow at each pixel position, and the moving speed and the travel direction of the moving object at the pixel position, and the effect is better.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
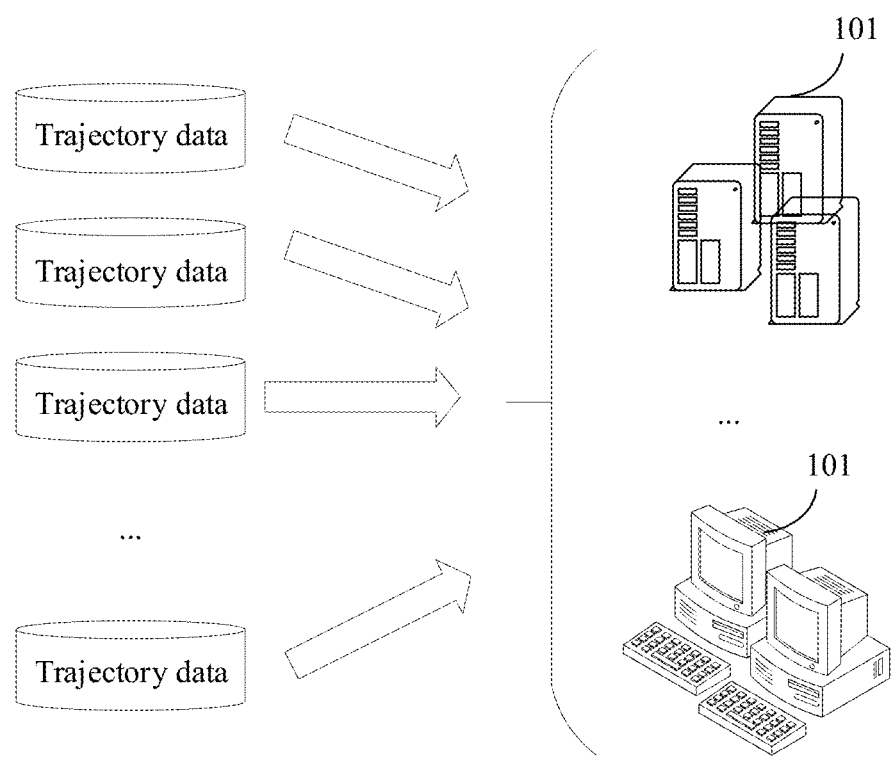
FIG. 1 is a schematic diagram of an implementation environment of a trajectory data processing method according to one or more embodiments of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In certain embodiments, the term "based on" is employed herein interchangeably with the term "according to."

In certain embodiments, the terms "first", "second", and the like used in the present disclosure may be used for describing various concepts in the present disclosure. However, the concepts are not limited by the terms unless otherwise specified. The terms are merely used for distinguishing one concept from another concept.

At least one refers to one or more, and for example, at least one moving object may be an integer number of moving objects, the integer being any integer greater than or equal to one, such as one, two, or three moving objects. Moreover, a plurality of refers to two or more, and for example, a plurality of moving objects may be an integer number of moving objects, the integer being any integer greater than or equal to two, such as two or three moving objects.

Before explaining and illustrating the embodiments of the present disclosure in detail, some abbreviations and key terms involved in the embodiments of the present disclosure are first defined.

Trajectory data refers to data information formed by sampling a motion process of one or more moving objects. The trajectory data generally includes thousands of trajectories.

In certain embodiments, the trajectory data generally includes position information of a sampling point, sampling time information, a speed of a moving object, etc. As an example, the position information of the sampling point is generally represented by longitude and latitude, which is not specifically limited in the embodiments of the present disclosure.

In addition, sources for the trajectory data may be various and complicated. In certain embodiments, the trajectory data may be obtained through a Global Positioning System (GPS) positioner, a mobile terminal service (for example, a mobile phone service), a communication base station, and other ways, where the trajectory data also has the massive, real-time and diverse characteristics.

Road network refers to a road system constituted by various roads linked and interleaved with each other in a network distribution in a certain region. As an example, a traffic road, a traffic junction, or a traffic network constituted by many roads such as main roads, subsidiary roads, branch roads, and side roads can all be referred to as the road network.

For the related art mentioned above, the embodiments of the present disclosure provide a novel massive trajectory modeling method based on multi-channel feature expression, and the method can solve the following problems existing in the related art:

(1) Lack of Depiction of Historical Massive Trajectory Data.

The historical massive trajectory data can depict the motion situation of the moving object in the real world more truly, while the related art cannot effectively apply same to the road network update due to the lack of the road network deep-level knowledge implied based on the historical massive trajectory data mining. The road network deep-level knowledge includes, but is not limited to: historical trajectory flow represents importance of the road, the speed represents the travel capability of the road, and the like, which is not specifically limited in the embodiments of the present disclosure.

(2) Single Trajectory Modeling Method.

As stated above, the related art merely relates to simply modeling the trajectory; however, the expression way and generation mechanism of the trajectory data are different from certain space data in the related art; intrinsic characteristics such as spatio-temporal coupling, high dimension, complex spatial scale information, and massive data more require a reasonable trajectory modeling method to analyze and process the trajectory data so as to expand and enrich the subsequent mining means and to improve the mining effect.

In the embodiments of the present disclosure, the multi-channel feature expression based massive trajectory modeling method implements modeling of the historical massive trajectory data in a new 3D space; in another expression way, constructing a trajectory flow map layer, a moving speed map layer, and a travel direction map layer implements depiction of the historical massive data, and effectively preserves important feature information of the trajectory data. In addition, the trajectory modeling way provided by the embodiments of the present disclosure further has good universality, facilitates expanding and enriching the subsequent mining means, and can provide a technical basis for implementing simple, efficient, active, and intelligent trajectory information trajectory mining in a road network update system. In addition, the embodiments of the present disclosure further introduce a visualization module to facilitate intuitive analysis of the motion mode of the moving object in the real world.

The implementing environment of a trajectory data processing method (also referred to as a trajectory modeling method) provided by an embodiment of the present disclosure is introduced and explained by combining FIG. 1.

Referring to FIG. 1, the implementing environment includes a trajectory data processing device 101 configured to collect massive trajectory data from various paths, for example, the trajectory data processing device 101 may access a plurality of trajectory data sources for collecting the trajectory data; in addition, the trajectory data processing device 101 is further configured to execute, based on the collected massive trajectory data, the massive trajectory modeling method based on multi-channel feature expression provided by the embodiments of the present disclosure.

In certain embodiments, the trajectory data processing device 101 can obtain the trajectory data collected in multiple ways such as the GPS positioner, the mobile phone service, and the communication base station, which is not specifically limited in the embodiments of the present disclosure. The trajectory data processing device 101 is a computer device having a calculating capability. As an example, the trajectory data processing device 101 can be a computer device such as a desktop, a laptop, or a server, which is not specifically limited in the embodiments of the present disclosure.

Figure 2:
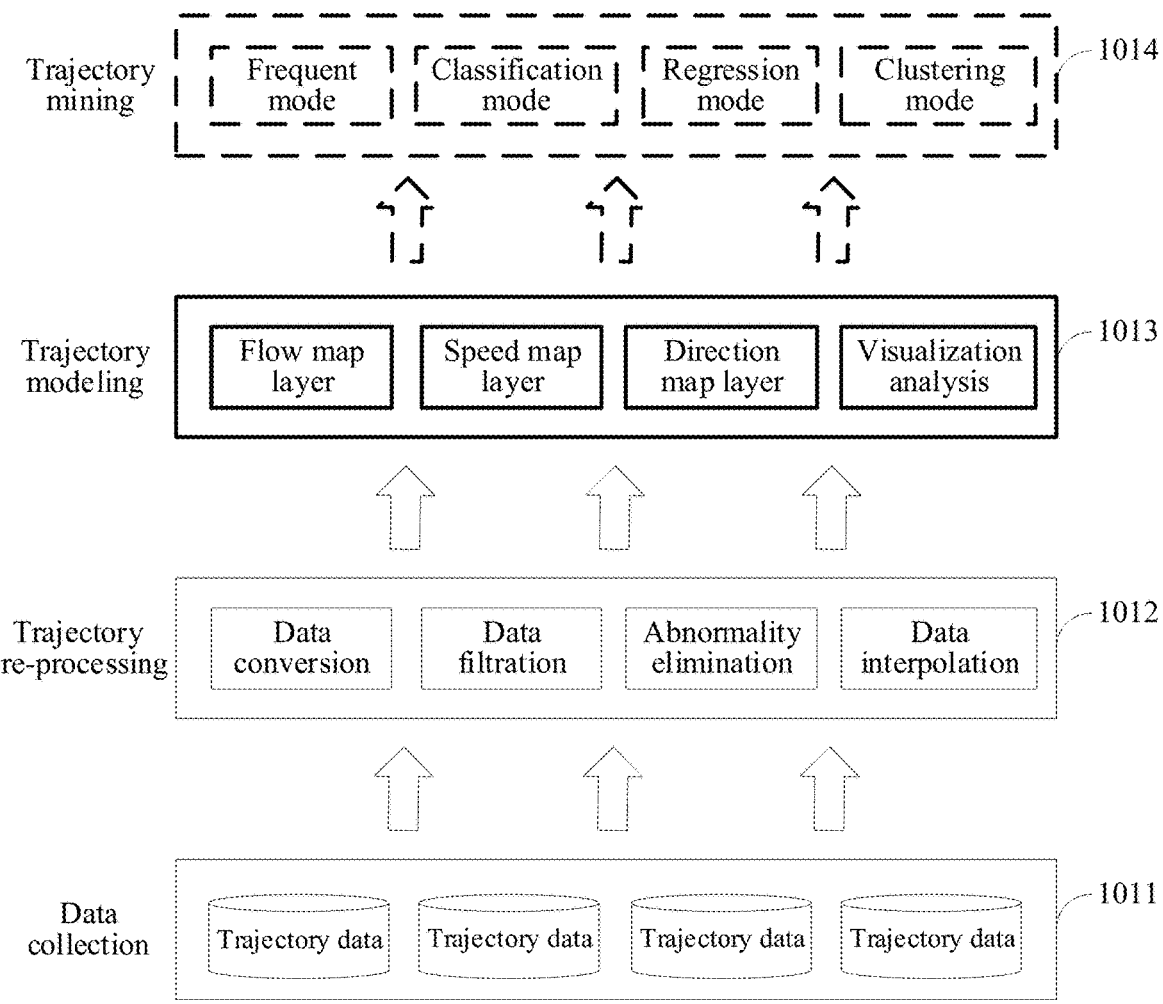
FIG. 2 is a schematic process architecture diagram of processing trajectory data according to one or more embodiments of the present disclosure.

The massive trajectory modeling method based on multi-channel feature expression provided by the embodiments of the present disclosure can be applicable to trajectory mining. As shown in FIG. 2, after completing analysis of the pre-processed trajectory data based on the trajectory modeling method provided by the embodiments of the present disclosure, trajectory mining can be directly performed based on a trajectory modeling result. In another expression way, the embodiments of the present disclosure can provide a technical basis for implementing simple, efficient, active, and intelligent trajectory information mining in the road network update system. The key for the trajectory information mining in the road network update system is how to use the historical massive trajectory to discover differences and similarities between road network data and the real world, so as to rapidly update a space position, a topological relation, and some attribute features of the road network data, to finally form a more comprehensive road network database, which plays an important role in both improving timeliness of the road network data and reducing the data collection cost. That is, the massive trajectory modeling method is a quite basic and key technique in trajectory information mining.

In certain embodiments, referring to FIG. 2, the trajectory data processing device 101 can include a data collection module 1011, a trajectory pre-processing module 1012, a trajectory modeling module 1013, and a trajectory mining module 1014.

In short, based on the modules above, the trajectory data processing device 101 first uniformly manages and stores multi-source trajectory data, then reduces or eliminates abnormal trajectories and noises in the trajectory data, then constructs a multi-map layer feature channel for the trajectory data and performs visualization analysis using a visualization tool. In addition, trajectory mining can also be performed based on the trajectory modeling result to perform a deep research on the trajectory data.

In detail, the data collection module 1011 is responsible for accessing a plurality of trajectory data sources for collecting the trajectory data. In another expression way, the data collection module 1011 is configured to uniformly manage and store the trajectory data collected from the real world. The trajectory data provided by each trajectory data source can be different, and moreover, the data collection module 1011 can uniformly manage and store the trajectory data in all data formats for facilitating the subsequent usage.

A data quality of the trajectory data collected from the real world is different from a quality requirement required by a mining object to a certain degree, and therefore, the trajectory pre-processing module 1012 is responsible for rapidly and effectively eliminating the abnormal trajectories and noises in the collected trajectory data to improve the data quality.

Figure 3:
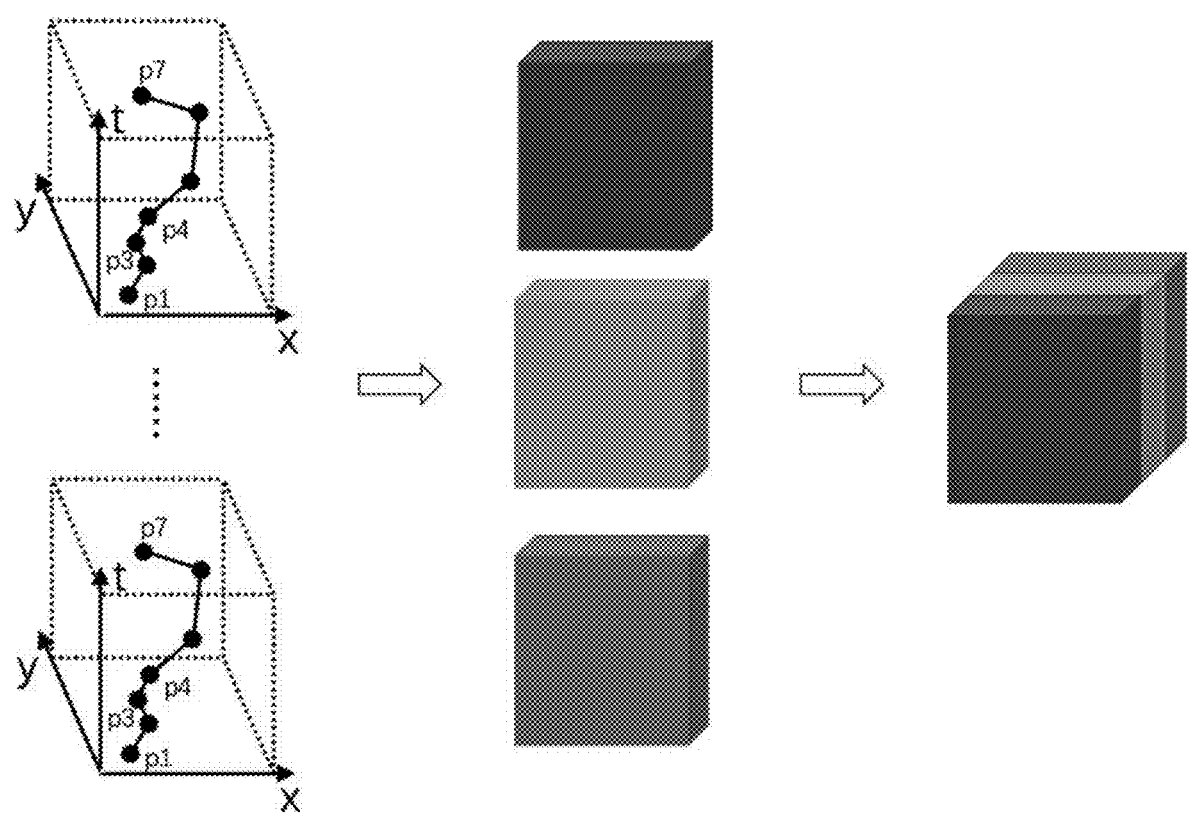
FIG. 3 is a schematic construction diagram of a multi-feature map layer according to one or more embodiments of the present disclosure.

The trajectory modeling module 1013 is a core part of the embodiments of the present disclosure, and is configured to model the collected trajectory data as a new 3D space data as shown in FIG. 3 by constructing the trajectory flow map layer, the travel direction map layer, and the moving speed map layer; this trajectory modeling way can effectively preserve the important feature information of the trajectory data while introducing the visualization module to facilitate intuitive analysis of the motion mode of the moving object in the real world.

Referring to FIG. 3, the trajectory can be regarded as a 3D folding line formed by motion of the moving object in time-space; the folding line is generally represented by a series of position points arranged according to time. For example, FIG. 3 shows a trajectory s, where the trajectory s can be represented by $S:p_1 \rightarrow p_2 \rightarrow \ldots p_n$, $p_i=(x,y,t)$ represents a coordinate (x, y) of the geographical space position sampled at moment t, where x and y are generally represented by longitude and latitude, which is not specifically limited by the embodiments of the present disclosure.

In FIG. 3, during construction of a multi-feature map layer based on massive trajectory data, the uppermost map layer of a second column refers to the trajectory flow map layer, a middle map layer of the second column refers to the moving speed map layer, and the lowermost map layer of the second column refers to the travel direction map layer, so as to implement modeling of the trajectory data as new 3D space data in three dimensions of flow, speed, and direction. In certain embodiments, the embodiments of the present disclosure adopt red to represent the flow, green to represent the speed, and blue to represent the direction.

The trajectory mining module 1014 is responsible for combining different mining modes to implement the deep research on the trajectory data upon completion of the trajectory modeling to mine the motion mode of the moving object in the real world.

In summary, the embodiments of the present disclosure provide a novel massive trajectory modeling method based on multi-channel feature expression. A comprehensive consideration of attribute information of multiple dimensions including the trajectory flow, the moving speed, and the travel direction is implemented through multi-channel feature fusion, and the spatio-temporal information and related attributes of the trajectory data are effectively preserved, to facilitate spatio-temporal analysis, exploration, and visualization. In another expression way, the embodiments of the present disclosure relate to a feature modeling method in the trajectory mining technology, and can express the motion mode of the moving object in the real world based on the massive trajectory data, so as to provide a technical basis for implementing simple, efficient, active, and intelligent trajectory information mining in the road network update system.

The trajectory data processing method provided in the embodiments of the present disclosure is described below in detail.

Descriptions such as first, second, third, and fourth in the following embodiments are intended to merely distinguish different objects rather than constitute any other limitation.

Figure 4:
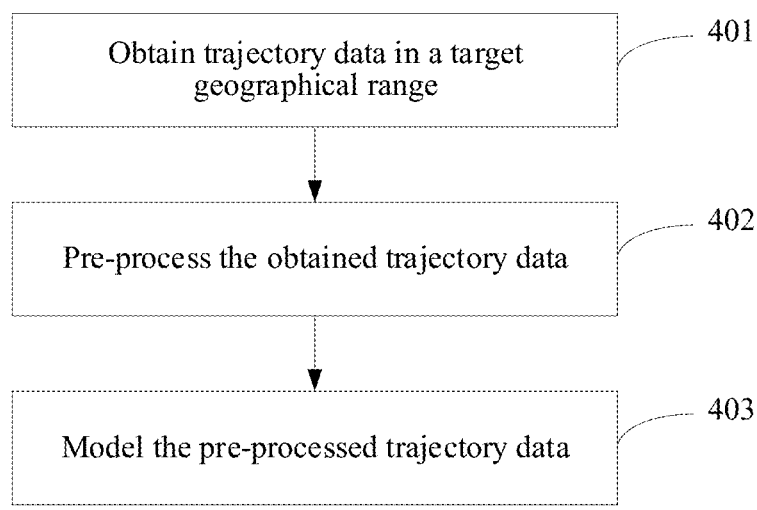
FIG. 4 is a schematic flowchart of a trajectory data processing method according to one or more embodiments of the present disclosure.

FIG. 4 is a flowchart of a trajectory data processing method according to an embodiment of the present disclosure. Referring to FIG. 4, the method flow provided by the embodiments of the present disclosure includes the following steps:

401: A trajectory data processing device obtains trajectory data in a target geographical range.

This step is used for collecting the trajectory data.

In certain embodiments, the collected trajectory data can be the trajectory data in the target geographical range. For example, the target geographical range can be nationwide, citywide and district-wide, etc., which is not specifically limited in the embodiments of the present disclosure.

In the embodiments of the present disclosure, a plurality of trajectory data sources can be accessed for collecting the trajectory data. The embodiments of the present disclosure can uniformly manage and store the trajectory data collected from the real world. In addition, the trajectory data provided by each trajectory data source can be different, and moreover, the embodiments of the present disclosure can uniformly manage and store the trajectory data in all data formats for facilitating the subsequent usage.

The collected trajectory data is generally massive, for example, the collected trajectory data generally includes thousands of moving trajectories of thousands of moving objects. Accordingly, the embodiments of the present disclosure can model the historical massive trajectory.

Taking the road network as an example, the moving objects generally refers to vehicles, which is not specifically limited in the embodiments of the present disclosure.

402: The trajectory data processing device pre-processes the obtained trajectory data.

The data quality of the trajectory data collected from the real world is different from the quality requirement required by a mining object to a certain degree, and therefore, after the trajectory data is collected, it is also required to first eliminating the abnormal trajectories and noises in the trajectory data to improve the data quality.

In certain embodiments, as shown in FIG. 2, the pre-processing includes at least one of the following steps:
(a) Data Conversion This step is used for dividing the collected trajectory data according to the grid region. That is, the target geographical range is split into a plurality of grid regions according to spaces, where the grid regions are shown as the left drawing in FIG. 3; and then each moving trajectory included in the collected trajectory data is divided according to the grid region to which the moving trajectory belongs.

In certain embodiments, taking nationwide as an example, the nationwide trajectory data collected can be split into a plurality of rectangles according to the space for grid management. As an example, the embodiments of the present disclosure take a rectangle with a width of 12 kilometers (km) and a height of 8 km as a unit of the split grids; accordingly, the nation is split into about 300,000 grid regions; then all the collected trajectory data are split according to the grid regions to which the collected trajectory data belongs.

In addition, for the trajectory across a plurality of grid regions, it can be truncated according to the boundaries of the grid regions, to facilitate data decoupling and subsequent parallel processing and analysis, which is not specifically limited by the embodiments of the present disclosure.
(b) Data Filtration This step is, according to a set filter condition, filtering each moving trajectory included in the collected trajectory data.

In certain embodiments, the embodiments of the present disclosure can filter the trajectory meeting at least one of the following conditions: the journey time is less than a certain time threshold, a journey distance is less than a certain distance threshold, and the number of the sampling points included in the trajectory is less than a certain number threshold. The number of the sampling points is generally the GPS point number.
(c) Abnormality Elimination This step is performing abnormality elimination processing on each moving trajectory included in the collected trajectory data. In another expression way, this step is used for performing secondary truncation of the trajectory.

As an example, for a trajectory, when or in response to determining two adjacent sampling points (assuming that the two sampling points are respectively Pm and Pn) in the trajectory relatively departs from each other in value, Pm is used as a breakpoint to truncate the entire trajectory; in a similar fashion, the steps above are recursively implemented until the entire trajectory is traversed once. Relatively departing from each other in value generally refers to departing from each other in space or time, which is not specifically limited in the embodiments of the present disclosure.
(d) Data Interpolation This step is performing data interpolation processing on each moving trajectory included in the collected trajectory data.

In certain embodiments, a linear interpolation algorithm is used for estimating a value of the moving object at an unsampled position, where the value herein may refer to position information, time information, speed, or the like, which is not specifically limited in the embodiments of the present disclosure.

403: The trajectory data processing device performs feature modeling on the pre-processed trajectory data.

This step is used for modeling the collected trajectory data in the new 3D space as shown in FIG. 3, and modeling the historical massive trajectory data by constructing the trajectory flow map layer, the travel direction map layer, and the moving speed map layer; this trajectory modeling way can effectively preserve the important feature information of the trajectory data.

Figure 5:
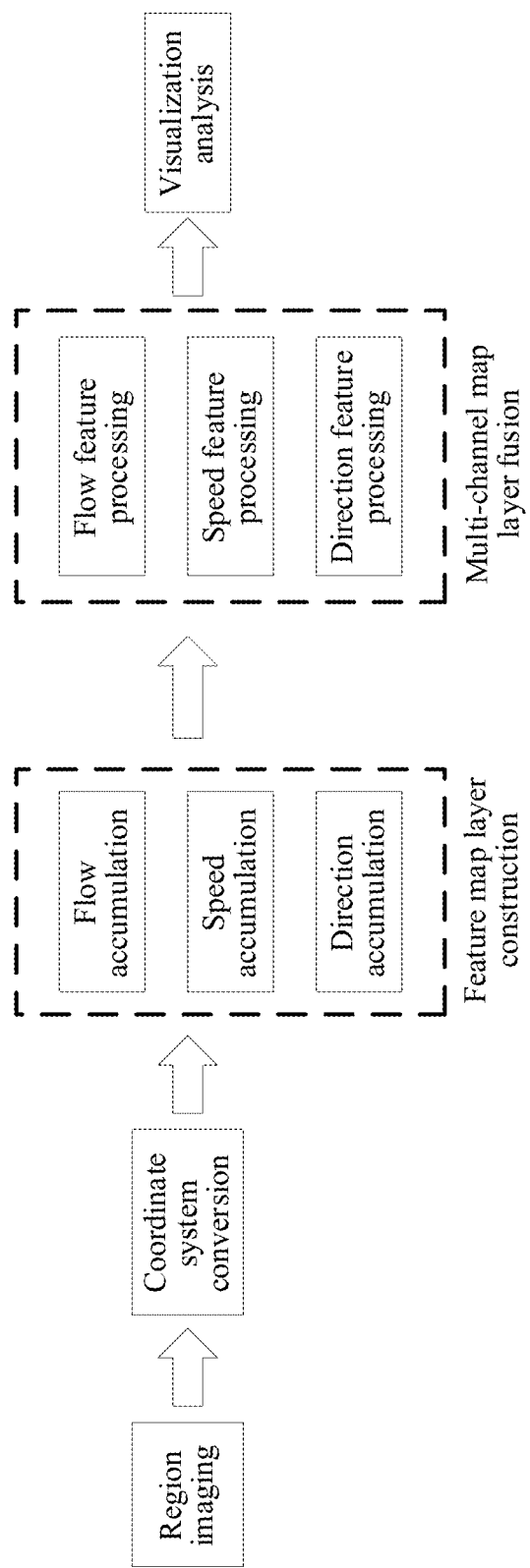
FIG. 5 is a schematic execution flowchart of a trajectory modeling process according to one or more embodiments of the present disclosure.
Figure 6:
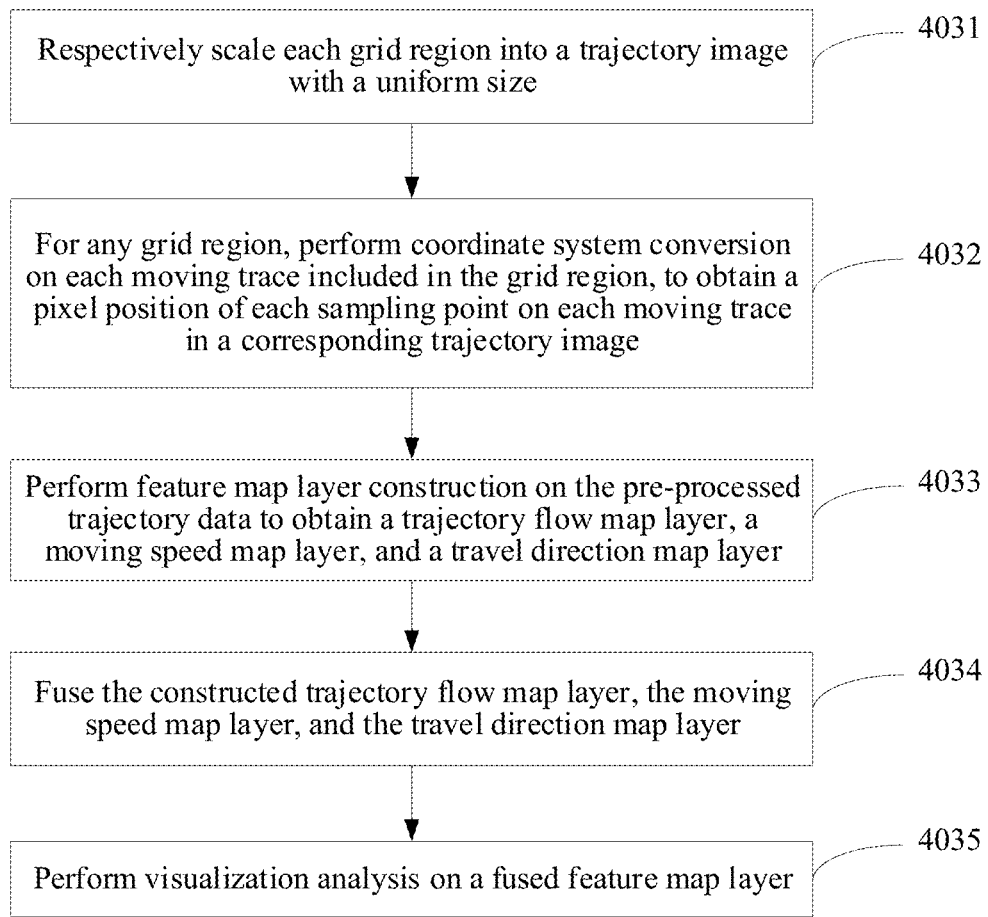
FIG. 6 is a schematic method flowchart of a trajectory modeling process according to one or more embodiments of the present disclosure.

In certain embodiments, as shown in FIG. 5, the trajectory modeling process can be divided into five steps of region imaging, coordinate system conversion, feature map layer construction, multi-channel map layer fusion, and visualization analysis. In another expression way, referring to FIG. 6, the trajectory modeling includes the following processing flow:

Region Imaging

4031: Respectively scale each grid region into a trajectory image with a uniform size.

Region imaging is used for respectively scaling the split grid regions into images with a certain fixed size. For example, the grid regions obtained by spatially splitting the nationwide geographical region are respectively scaled to images with a certain fixed size.

As an example, the size of the trajectory image may be 8192 pixels high and 9420 pixels wide; corresponding to an actual geographical region, the resolution ratio of each pixel is about 1.5 m, which is not specifically limited by the embodiments of the present disclosure.

Coordinate System Conversion

4032: For any grid region, perform coordinate system conversion on each moving trajectory included in each grid region, to obtain a pixel position of each sampling point on each moving trajectory in a corresponding trajectory image.

This step is used for converting geographical coordinates into image coordinates. The geographical coordinates generally refer to the GPS coordinates, for example, longitude and latitude coordinates. In the embodiments of the present disclosure, for all trajectory data falling in any grid region, the pixel position of each sampling point on each moving trajectory falling in the corresponding trajectory image may be calculated, and the pixel position can be indicated by (loc_x, loc_y) herein.

In certain embodiments, for any grid region, performing coordinate system conversion on each moving trajectory included in each grid region, to obtain a pixel position of each sampling point on each moving trajectory in a corresponding trajectory image can be implemented using the following ways:

(a) Obtain longitude and latitude coordinates of a region boundary of the grid region.

The region boundary includes a left boundary, a right boundary, an upper boundary, and a lower boundary; accordingly, the longitude and latitude coordinates of the region boundary include longitude and latitude coordinates of the left boundary, longitude and latitude coordinates of the right boundary, longitude and latitude coordinates of the upper boundary, and longitude and latitude coordinates of the lower boundary.

(b) Obtain a height value and a width value of a corresponding trajectory image of the grid region.

The height value and the width value respectively represent the pixel size of the height and width of the trajectory image.

(c) For any sampling point, obtain a horizontal axis coordinate of the sampling point in the trajectory image according to the longitude and latitude coordinates of the left and right boundaries of the grid region, the width value of the trajectory image, and a longitude coordinate of the sampling point; and obtain a longitudinal axis coordinate of the sampling point in the trajectory image according to the longitude and latitude coordinates of the upper and lower boundaries of the grid region, the height value of the trajectory image, and a latitude coordinate of the sampling point.

In the embodiments of the present disclosure, the horizontal axis refers to x-axis, and the longitudinal axis refers to y-axis; this step is calculating loc_x and loc_y.

As an example, assuming that a grid region is Rect(left, right,top,bottom) where each parameter separately represents the longitude and latitude coordinates of the region boundary of the grid region; a parameter left refers to the longitude and latitude coordinates of the left boundary; a parameter right refers to the longitude and latitude coordinates of the right boundary; a parameter top refers to the longitude and latitude coordinates of the upper boundary; a parameter bottom refers to the longitude and latitude coordinates of the lower boundary; accordingly, the trajectory image obtained by scaling the grid region is img(height, width), where a parameter height represents the height of the trajectory image; a parameter width represents the width of the trajectory image; taking each sampling point being Pt(x, y) as an example, parameters x and y respectively represent the longitude and the latitude of the sampling point, and during coordinate system conversion, calculation equations for the coordinates of the horizontal axis and the longitudinal axis above are respectively as follows:

$$loc\_x = (Pt \cdot x - Rect \cdot left)/(Rect \cdot right - Rect \cdot left) * img \cdot width$$

$$loc\_y = (Rect \cdot top - Pt \cdot y)/(Rect \cdot top - Rect \cdot bottom) * img \cdot height$$

The above provides, in certain embodiments, an implementation for coordinate system conversion; besides, other ways can also be used for coordinate system conversion; the embodiment of the present disclosure does not specifically limit same.

Feature Map Layer Constructing

In certain embodiments, for the feature map layer construction, the embodiments of the present disclosure may construct the trajectory flow map layer, the moving speed map layer, and the travel direction map layer. The physical meaning for the trajectory flow map layer is: representing an actual flow value in the corresponding geographical space region, where the flow can reflect the importance of the road; the higher the flow is, the more important the road is. The physical meaning for the speed map layer is: representing an actual travel speed in the corresponding geographical space region. The physical meaning for the direction map layer is: representing an actual travel direction in the corresponding geographical space region.

4033: Perform feature map layer construction on the pre-processed trajectory data to obtain the trajectory flow map layer, the moving speed map layer, and the travel direction map layer.

Figure 7:
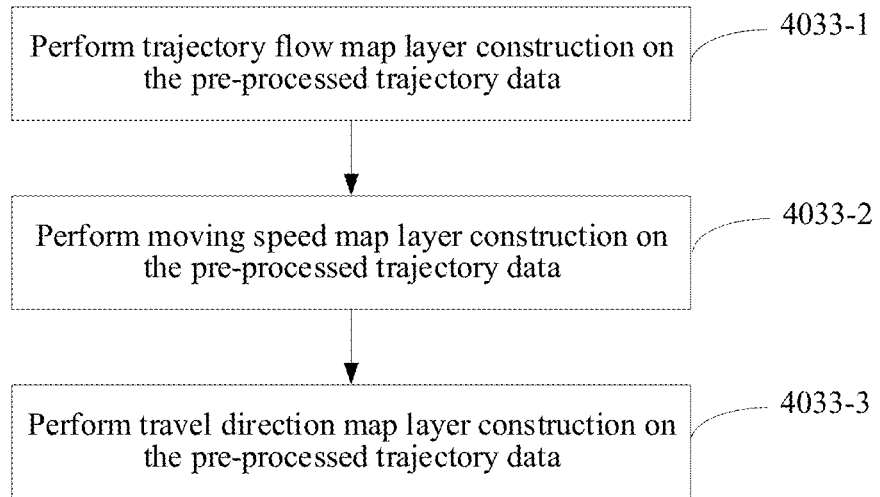
FIG. 7 is a schematic construction flowchart of a feature map layer according to one or more embodiments of the present disclosure.

The embodiments of the present disclosure perform feature map layer construction using the grid region as a unit. In another expression way, a trajectory image obtained by scaling one grid region separately corresponds to one trajectory flow map layer, one moving speed map layer, and one travel direction map layer. Referring to FIG. 7, the feature map layer construction includes the following steps:

4033-1: Perform trajectory flow map layer construction on the pre-processed trajectory data.

In certain embodiments, the trajectory flow map layer constructing process includes the following steps:

for each pixel position in any trajectory image, based on a corresponding pixel position of each sampling point on each moving trajectory included in a corresponding grid region in the trajectory image, detecting whether each of the moving trajectories is intersected with the pixel position; and when or in response to determining one of the moving trajectories is intersected with the pixel position, adding one to a trajectory flow at the pixel position; and repeating the process above until traversing each sampling point on each moving trajectory. The trajectory flow map layer includes a trajectory flow of each pixel position in the trajectory image.

Figure 8:
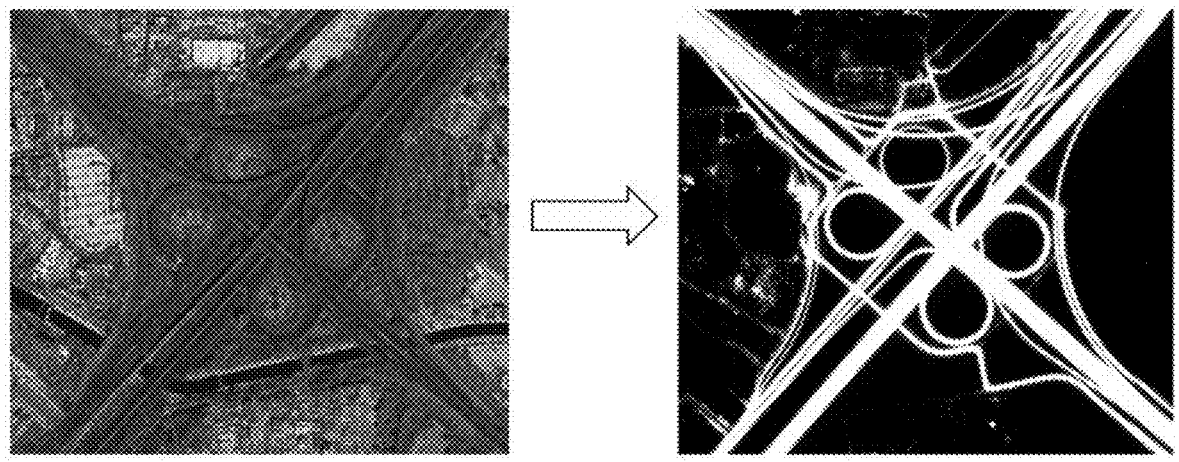
FIG. 8 is a schematic construction flowchart of a trajectory flow map layer according to one or more embodiments of the present disclosure.

As an example, the trajectory flow map layer constructing way relates to traversing each GPS point of each moving trajectory; calculating a pixel position of the GPS point in the corresponding trajectory image based on step 4032 above; and accumulating flow at the pixel position. In certain embodiments, the trajectory flow is calculated according to the following equation:

$$Flow_{ij} \mathrel{+}= \begin{cases} 1 & \text{if}(Traj \cap C_{ij}) \\ 0 & \text{else} \end{cases}$$

where $Flow_{ij}$ represents a flow value at $C_{ij}$ in the trajectory flow map layer, and an initial value thereof is 0; $Traj \cap C_{ij}$ represents whether the current moving trajectory is intersected with $C_{ij}$; and therefore, the value space of the trajectory flow map layer outputted finally is $[0,+\infty]$ In the embodiments of the present disclosure, an intuitive effect of the trajectory flow map layer is shown in FIG. 8, where the left drawing in FIG. 8 is a trajectory image of the real world, and the right drawing therein is the trajectory flow map layer of the trajectory image. In addition, the brighter the position in the trajectory flow map layer is, the greater vehicle flow at the position is, and the stronger the travel capability of the road is.

The above provides, in certain embodiments, an implementation for constructing the trajectory flow map layer; besides, other ways can also be used for constructing the trajectory flow map layer, which is not specifically limited in the embodiments of the present disclosure.

4033-2: Perform moving speed map layer construction on the pre-processed trajectory data.

In certain embodiments, the moving speed map layer constructing process includes the following steps: for each pixel position in any trajectory image, based on a corresponding pixel position of each sampling point on each moving trajectory included in a corresponding grid region in the trajectory image, detecting whether each of the moving trajectories is intersected with the pixel position; when or in response to determining one of the moving trajectories is intersected with the pixel position, accumulating the moving speeds of the sampling points having the pixel position on the moving trajectory; obtaining an average moving speed based on a total number of the accumulated sampling points and a sum of the accumulated moving speeds; in response to the average moving speed being smaller than a speed threshold, using the average moving speed as a moving speed of a moving object at the pixel position; and repeating the process above until traversing each sampling point on each moving trajectory. The moving speed map layer includes a moving speed of the moving object at each pixel position in the trajectory image.

A first point to be explained is that the moving speed mentioned herein generally refers to an average moving speed.

As an example, the moving speed map layer constructing way relates to traversing each GPS point of each moving trajectory; calculating a pixel position of the GPS point in the corresponding trajectory image based on step 4032 above; and accumulating speed at the pixel position.

In certain embodiments, the speed unit used in the present disclosure is m/s, and a speed threshold is set, where the value of the speed threshold may be 50 m/s, which is not specifically limited in the embodiments of the present disclosure. Assuming that the maximum value of the default moving speed is 50 m/s, the embodiment of the present disclosure thus performs value truncation on the sampling points exceeding the speed maximum value (set as 50) to reduce abnormal interferences.

That is, the moving flow can be calculated according to the following equation:

$$\text{Speed}_{ij} \mathrel{+}= \begin{cases} \min(Traj.speed, 50) & \text{if}(Traj \cap C_{ij}) \\ 0 & \text{else} \end{cases}$$

where $\text{Speed}_{ij}$ represents a speed value at $C_{ij}$ in the moving speed map layer, and an initial value thereof is 0; $Trak \cap C_{ij}$ represents whether the current moving trajectory is intersected with $C_{ij}$; in addition, since the moving speeds of a plurality of sampling points are accumulated at each pixel position, in order to calculate an average moving speed at the position $C_{ij}$, is required to be divided by the sum of the number of the sampling points, to obtain Traj.speed. In addition, when or in response to determining the obtained Traj.speed is greater than the speed threshold, the size of Traj.speed is set as 50, for example, the value space of the moving speed map layer outputted finally is [0, 50].

Figure 9:
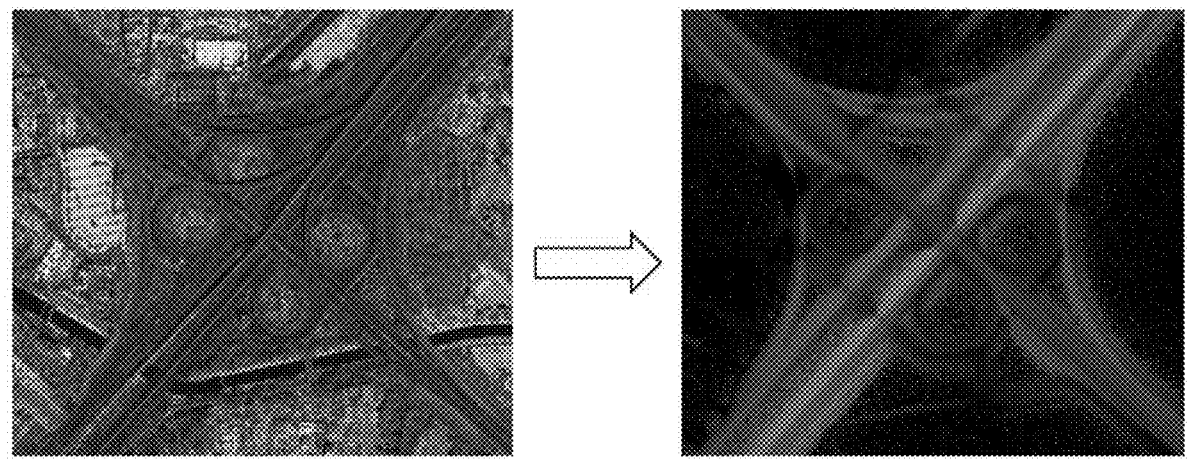
FIG. 9 is a schematic construction flowchart of a travel speed map layer according to one or more embodiments of the present disclosure.

In the embodiments of the present disclosure, an intuitive effect of the moving speed map layer is shown in FIG. 9, where the left drawing in FIG. 9 is a trajectory image of the real world, and the right drawing therein is the moving speed map layer of the trajectory image. In addition, the brighter the position in the moving speed map layer is, the greater the travel speed at the position is.

The above provides in certain embodiments, an implementation for constructing the moving speed map layer; besides, other ways can also be used for constructing the moving speed map layer, which is not specifically limited in the embodiments of the present disclosure.

4033-3: Perform travel direction map layer construction on the pre-processed trajectory data.

In certain embodiments, the travel direction map layer constructing process includes the following steps: for each pixel position in any trajectory image, based on a corresponding pixel position of each sampling point on each moving trajectory included in a corresponding grid region in the trajectory image, detecting whether each of the moving trajectories is intersected with the pixel position; when or in response to determining one of the moving trajectories is intersected with the pixel position, accumulating vector directions of the sampling points having the pixel position on the moving trajectory; and repeating the process above until traversing each sampling point on each moving trajectory. The travel direction map layer includes the vector direction of each pixel position in the trajectory image, and the vector direction represents a travel direction of a moving object.

As an example, the travel direction map layer constructing mode relates to traversing each GPS point of each moving trajectory; calculating a pixel position of the GPS point in the corresponding trajectory image based on step 4032 above; and accumulating the vector directions at the pixel position. In certain embodiments, a direction coordinate system adopted in the embodiments of the present disclosure is based on a due north included angle, and the vector direction can be calculated according to the following equation:

$$\overrightarrow{Dir}_{ij} \mathrel{+}= \begin{cases} \vec{\partial} & \text{if}(Traj \cap C_{ij}) \\ 0 & \text{else} \end{cases}$$

where $\overrightarrow{Dir}_{ij}$ represents the vector direction at $C_{ij}$ in the travel direction map layer, and an initial value thereof is $\vec{0}$, $Traj \cap C_{ij}$ represents whether the current moving trajectory is intersected with $C_{ij}$, and $\partial$ a represents the vector direction of each sampling point. The value space of the travel direction map layer output finally is [0, 360]

Figure 10:
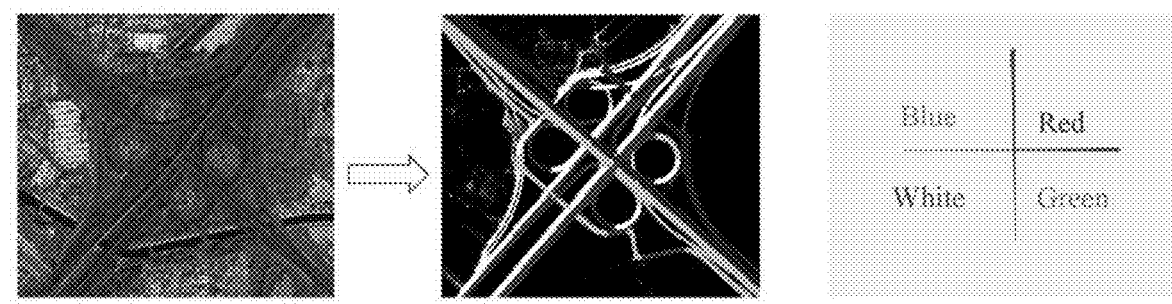
FIG. 10 is a schematic construction flowchart of a travel direction map layer according to one or more embodiments of the present disclosure.

In the embodiments of the present disclosure, the intuitive effect of the travel direction map layer is shown in FIG. 10. The left drawing in FIG. 10 is a trajectory image of the real world, the middle drawing is the travel direction map layer of the trajectory image, and the right drawing is used for representing a quadrant color.

In certain embodiments, the embodiments of the present disclosure divide the direction into four quadrants, while the vector directions falling in different quadrants are exhibited in different colors. For example, the first quadrant adopts red, the second quadrant adopts green, the third quadrant adopts white, and the fourth quadrant adopts blue. Accordingly, the travel direction map layer is displayed in four colors, for example, red, green, white, and blue.

The above provides in certain embodiments, an implementation for constructing the travel direction map layer; besides, other ways can also be used for constructing the travel direction map layer, which is not specifically limited in the embodiments of the present disclosure.

Multi-Channel Map Layer Fusion

4034: Fuse the constructed trajectory flow map layer, the moving speed map layer, and the travel direction map layer.

This step is used for splicing and combining the trajectory flow map layer, the moving speed map layer, and the travel direction map layer constructed in step 4033. Two problems are solved herein:

(1) The value spaces for different map layers are quite different, and may need to be subjected to uniform conversion.

As stated above, the value space for the trajectory flow map layer is [0, +∞] the value space for the moving speed map layer is [0, 50], and the value space for the travel direction map layer is [0, 360].

(2) The direction feature belongs to a categorical feature, the size of the value thereof is meaningless during fusion of the map layers, and the direct splicing and combining effect is not ideal.

For the two problems above, the embodiments of the present disclosure would process the flow features and the speed and direction features in the following ways, and the process is as follows:

Flow Feature Processing:

4034-1: Perform flow feature processing on the trajectory flow map layer to obtain a first feature map layer.

In certain embodiments, the performing flow feature processing on the trajectory flow map layer includes the following steps: obtaining a flow value upper limit, a first smoothing factor, and a second smoothing factor; obtaining a maximum trajectory flow in the trajectory flow map layer; and for any pixel position in the trajectory flow map layer, obtaining the trajectory flow of the pixel position again based on the trajectory flow of the pixel position, the first smoothing factor, the second smoothing factor, the maximum trajectory flow, and the flow value upper limit.

As an example, the flow value upper limit is set as 255, which is not specifically limited in the embodiments of the present disclosure. In addition, in order to effectively represent the flow change trend and effectively separate the moving trajectories corresponding to different roads, the embodiments of the present disclosure can further optimize the trajectory flow map layer using the following equation:

$$Flow_{ij} = \frac{\log(Flow_{ij} + \alpha)}{\log(\max(Flow) + \beta)} * 255$$

where $Flow_{ij}$ represents the flow value at a certain pixel position of the trajectory flow map layer; max(Flow) indicates the maximum flow value in the trajectory flow map layer; $\alpha$, $\beta$ represents a smoothing factor, and a value thereof is a constant; in this text, $\alpha$ is also referred to as a first smoothing factor, $\beta$ is also referred to as a second smoothing factor; as an example, the embodiments of the present disclosure can separately use $\alpha=1$, $\beta=2$.

Figure 11:
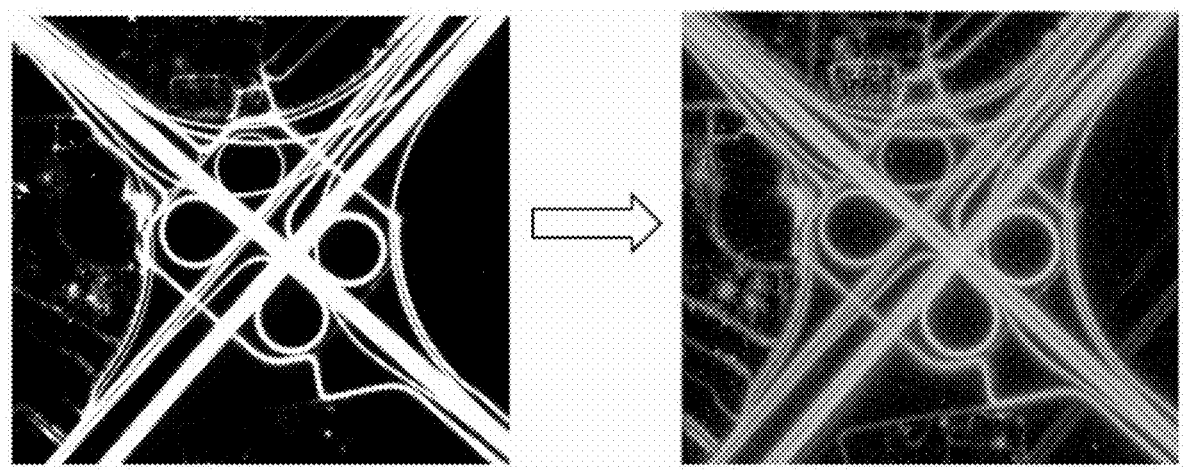
FIG. 11 is a schematic diagram of processing a flow feature according to one or more embodiments of the present disclosure.

The equation above converts the value space of the entire trajectory flow map layer from [0, +∞] to [0,255] and at the same time, the equation also preserves the textures of the massive trajectory flow changes, and the differentiation is stronger; the processed trajectory flow map layer can be shown in the right drawing in FIG. 11, where the left drawing in FIG. 11 shows the trajectory flow map layer before the feature processing.

Direction and Speed Feature Processing 4034-2: Project the moving speed of the moving speed map layer on the direction space based on the travel direction map layer, to obtain a second feature map layer.

In the embodiments of the present disclosure, in order to effectively process the travel direction map layer, the embodiments of the present disclosure may comprehensively consider the speed feature and the direction feature, project the speed on the direction space, and can more reasonably and effectively fuse the direction feature into the multi-map layer channel while preserving speed feature details.

In certain embodiments, the projecting the moving speed of the moving speed map layer in the direction space based on the travel direction map layer includes the following steps: for any pixel position, obtaining, in the moving speed map layer, the moving speed of the moving object at the pixel position; obtaining a vector direction of the moving object at the pixel position in the travel direction map layer; using a product of the moving speed and a sine value of the vector direction as a moving speed of the pixel position in a longitudinal axis direction; and using a product of the moving speed and a cosine value of the vector direction as a moving speed of the pixel position in a horizontal axis direction.

As an example, for the moving speed $Speed_{ij}$ at each pixel position obtained in step 4033-2 above and the vector direction $\theta$ accumulated at each pixel position obtained in step 4033-2 above, the embodiments of the present disclosure use a product of a sine value of the direction angle and the moving speed as an average moving speed of the pixel position in a y-axis direction, and use a product of a cosine value of the direction angle and the moving speed as an average moving speed of the pixel position in an x-axis direction. With this regard, the value spaces of the calculation results of the x-axis and y-axis are respectively [−50, 50], where plus and minus represents opposite directions; and finally, the value space is converted from [−50,50] to [0,255] using the linear conversion, and the detailed calculation equation is shown below:

$$\begin{cases} Sy_{ij} = Speed_{ij} * \sin\theta \\ Sx_{ij} = Speed_{ij} * \cos\theta \end{cases}$$

where $Sy_{ij}$ represents the average moving speed in the y-axis direction, and $Sx_{ij}$ represents the average moving speed in the x-axis direction.

A first point to be explained is that the above provides, in certain embodiments, an implementation for speed and direction feature processing; besides, other modes can also be used for speed and direction feature processing, which is not specifically limited in the embodiments of the present disclosure.

A second point to be explained is that after completing the feature processing above, different feature map layers have the same value space, for example, [0,255].

4034-3: Splice and combine the first feature map layer and the second feature map layer to obtain the fused feature map layer.

In certain embodiments, the term "splice" or "spliced" may alternatively refer to an action of combining or integrating and/or a state of being combined or integrated.

Figure 12:
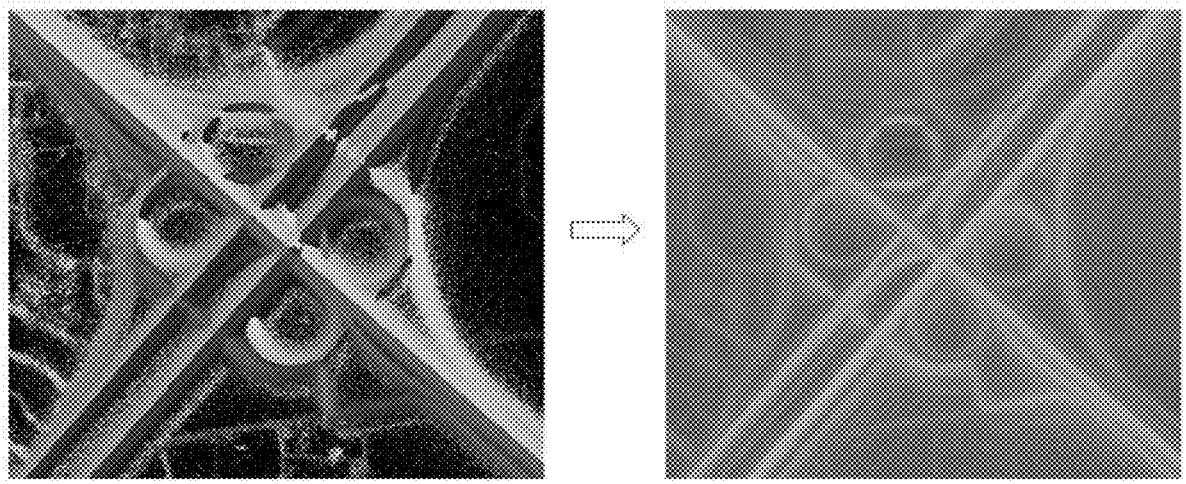
FIG. 12 is a schematic effect diagram after multi-channel feature fusion according to one or more embodiments of the present disclosure.

As shown in FIG. 12, the left drawing in FIG. 12 is an effect drawing of an effect after multi-channel map layer fusion before feature processing, and the right drawing is an effect drawing after feature processing and then multi-channel map layer fusion.

Visualization Analysis

4035: Perform visualization analysis on a fused feature map layer.

This step is used for intuitive analysis of the historical trajectory flow, the historical average moving speed, and the historical travel direction at each pixel position.

When or in response to determining the fused feature map layer is displayed, functions provided by interface elements include, but are not limited to, positions, sizes, colors, feature display, and the like. Position refers to intuitively displaying the flow feature, the speed feature, and the direction feature at the pixel position in response to obtaining the selection instruction for any pixel position in the fused feature map layer. Size refers to a fused feature map layer corresponding to the foregoing grid region. Color refers to RGB components; as stated above, R represents flow, G represents speed, and B represents direction. Feature display is displaying the flow feature, the speed feature, and the direction feature at the corresponding pixel position.

Figure 13:
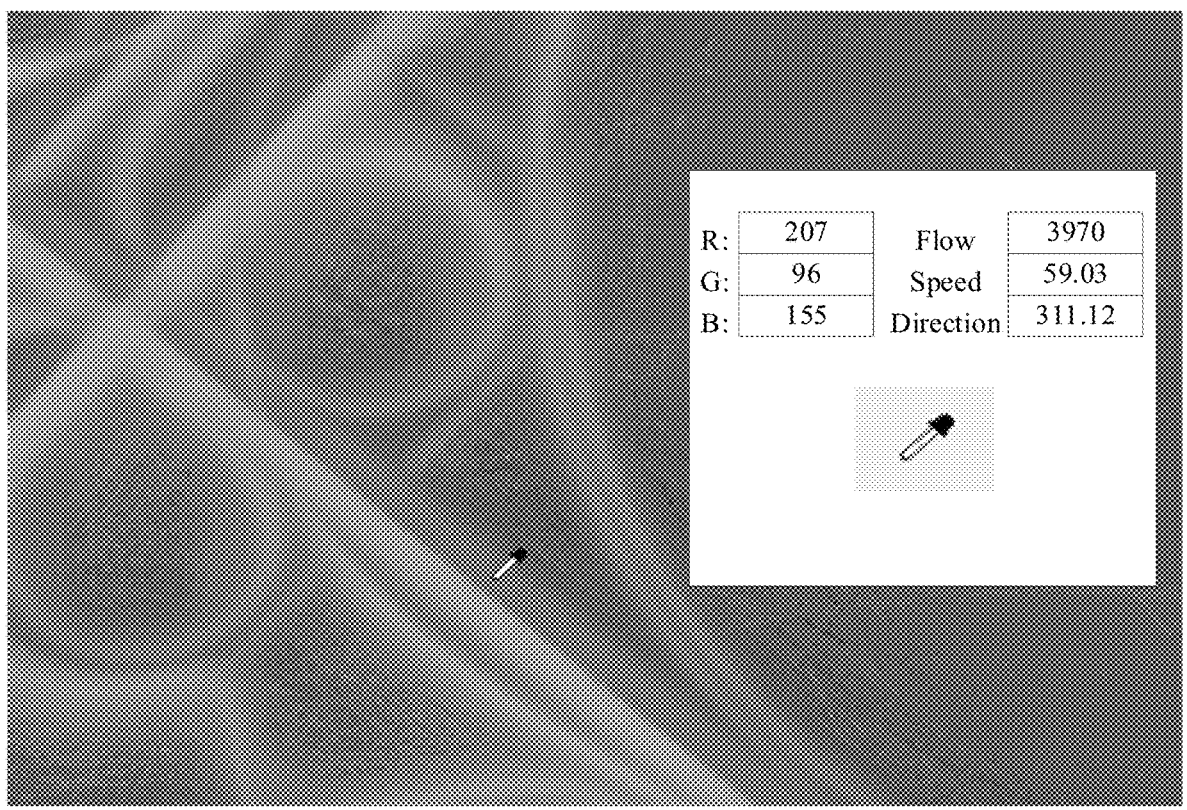
FIG. 13 is a schematic diagram of performing visualization analysis on a fused feature map layer according to one or more embodiments of the present disclosure.

In certain embodiments, after displaying the fused feature map layer using a visualized tool, as shown in FIG. 13, a trajectory flow at the pixel position and a moving speed and a travel direction of a moving object at the pixel position are displayed in response to obtaining a selection instruction of any pixel position on the fused feature map layer. As an example, the historical trajectory flow, the historical average moving speed, and the historical travel direction at the actual geographical position corresponding to the pixel position can be displayed.

In addition, when or in response to determining the trajectory flow, the moving speed, the travel direction, and other features are displayed, a feature display map layer can be superimposed and displayed on the fused feature map layer; and the trajectory flow, the moving speed, and the travel direction are displayed on the feature display map layer, which are not specifically limited in the embodiments of the present disclosure.

Taking FIG. 13 as an example, for each pixel position, different colors intuitively represent different travel situations in the real world; as shown in FIG. 13, three components, R, G, and B, at a specified pixel position where a cursor is located are respectively 207, 96, and 155; the historical trajectory flow corresponding to the pixel position is 3970 trajectories; the historical average moving speed of the vehicle is 59.03 km/h, and an included angle between the travel direction and the due north is 311.13 degrees.

The method provided in the embodiments of the present disclosure has at least the following beneficial effects:

Upon collection of the trajectory data, the embodiments of the present disclosure first pre-process the collected trajectory data, and then model the pre-processed trajectory data in the new 3D space, to construct a trajectory flow map layer, a travel direction map layer, and a moving speed map layer, for example, modeling the trajectory data as the new 3D space data in three dimensions of flow, speed, and direction; and finally forms a fused feature map layer using a multi-channel map layer fusion technique, and visualization analysis is performed on the fused feature map layer through a visualized tool.

That is, the embodiments of the present disclosure make a comprehensive consideration of attribute information of multiple dimensions including the trajectory flow, the moving speed, and the travel direction in a trajectory modeling phase by means of multi-channel feature fusion, which effectively preserves important feature information implied in the trajectory data, for example, spatio-temporal information and related attributes. On this basis, on one hand, the embodiments of the present disclosure can mine the motion mode of the moving object in the real world, for example, it can extract the real motion attribute, can form an integrated trajectory modeling frame of time, geography, and trajectory 3D visualization, and can be used for researching a moving object theory and used as a real data set; on the other hand, the embodiments of the present disclosure facilitate expanding and enriching the subsequent trajectory mining, and provide a technical basis for implementing simple, efficient, active, and intelligent trajectory information mining in the road network update system.

In another expression way, the embodiments of the present disclosure can not only mine the motion mode of the moving object in the real world with enhanced precision, but also improve the subsequent trajectory mining effect based on the massive trajectory data.

In addition, after displaying the fused feature map layer through a visualization tool, in response to obtaining a selection instruction of any pixel position on the fused feature map layer, the trajectory flow at the pixel position and the moving speed and the travel direction of the moving object at the pixel position can also be intuitively displayed, for example, the embodiments of the present disclosure can perform intuitive analysis on the historical trajectory flow, the historical average moving speed, and the historical travel direction at each pixel position, and the effect is better.

Figure 14:
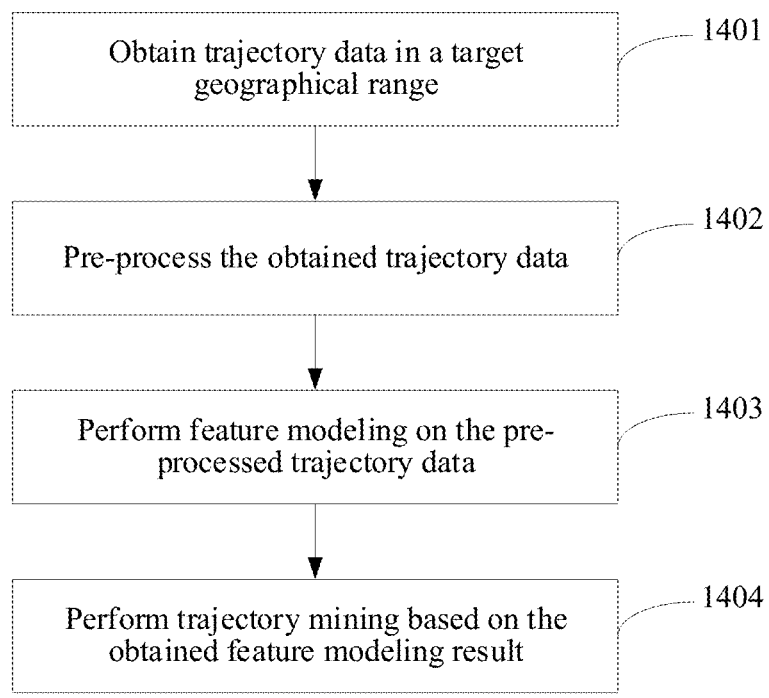
FIG. 14 is a schematic flowchart of combining trajectory modeling and trajectory mining processes according to one or more embodiments of the present disclosure.

In another embodiment, as shown in FIG. 2, after the processing of the trajectory modeling phase, the trajectory data subjected to trajectory modeling may be used for trajectory mining. That is, referring to FIG. 14, the method flow provided by the embodiment of the present disclosure further includes the following steps:

1401: Obtain trajectory data in a target geographical range.

1402: Pre-process the obtained trajectory data.

1403: Perform feature modeling on the pre-processed trajectory data.

1404: Perform trajectory mining based on the obtained feature modeling result.

This step is used for combining different mining modes to implement deep research on the trajectory data.

In certain embodiments, as shown in FIG. 2, the trajectory mining mode includes, but is not limited to: a frequent mode, a classification mode, a regression mode, and a clustering mode, which is not specifically limited in the embodiments of the present disclosure.

The frequent mode is sourced from a frequent item set; the meaning of the frequent item set is a series of sets, some of which have same elements; elements with high frequency of occurrence at the same time a subset, which meets a certain threshold conditions, and is a frequent item set. This mode can depict a user portrait based on the trajectory data.

The classification mode is used for performing, for example, classification on the trajectory data, or classification on the users based on the trajectory data, which is not specifically limited in the embodiments of the present disclosure. The regression mode is used for predicting a crowdedness degree of the road based on the trajectory data, etc. The clustering mode can predict based on places where the user often appears based on the trajectory data.

After collecting the trajectory data, the method provided by the embodiments of the present disclosure first pre-processes the collected trajectory data, and then models the pre-processed trajectory data in the new 3D space, to construct the trajectory flow map layer, the travel direction map layer, and the moving speed map layer, for example, modeling the trajectory data as the new 3D space data in three dimensions of flow, speed, and direction; and a fused feature map layer is formed using a multi-channel map layer fusion technique and visualization analysis is performed on the fused feature map layer through a visualized tool.

That is, the embodiments of the present disclosure make a comprehensive consideration of attribute information of multiple dimensions including the trajectory flow, the moving speed, and the travel direction in a trajectory modeling phase by means of multi-channel feature fusion, which effectively preserves important feature information implied in the trajectory data, for example, spatio-temporal information and related attributes. On this basis, on one hand, the embodiments of the present disclosure can mine the motion mode of the moving object in the real world with enhanced precision, for example, it can extract the real motion attribute, can form an integrated trajectory modeling frame of time, geography, and trajectory 3D visualization, and can be used for researching a moving object theory and used as a real data set; on the other hand, the embodiments of the present disclosure facilitate expanding and enriching the subsequent trajectory mining, and provide a technical basis for implementing simple, efficient, active, and intelligent trajectory information mining in the road network update system.

In another expression way, the embodiments of the present disclosure can not only mine the motion mode of the moving object in the real world with enhanced precision, but also improve the subsequent trajectory mining effect based on the massive trajectory data.

Figure 15:
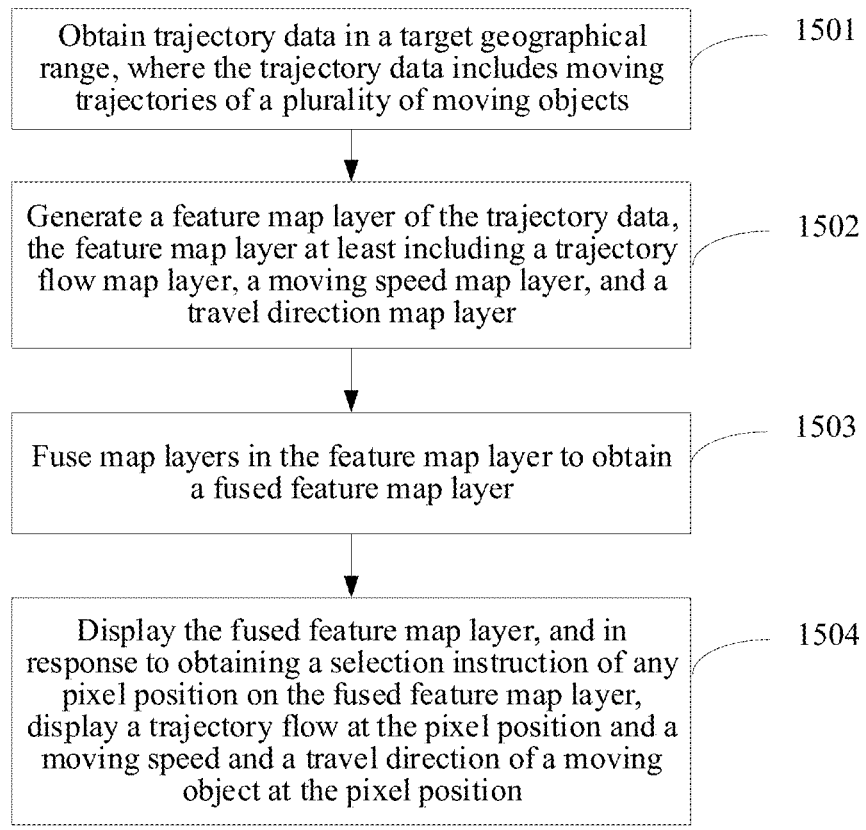
FIG. 15 is a schematic flowchart of a trajectory data processing method according to one or more embodiments of the present disclosure.

In another embodiment, the trajectory data processing method provided by the embodiments of the present disclosure further includes the method flow shown in FIG. 15:

1501: Obtain trajectory data in a target geographical range, where the trajectory data includes moving trajectories of a plurality of moving objects.

1502: Generate a feature map layer of the trajectory data, the feature map layer at least including a trajectory flow map layer, a moving speed map layer, and a travel direction map layer.

1503: Fuse map layers in the feature map layer to obtain a fused feature map layer.

1504: Display the fused feature map layer; and in response to obtaining a selection instruction of any pixel position on the fused feature map layer, display a trajectory flow at the pixel position and a moving speed and a travel direction of a moving object at the pixel position.

In the embodiments of the present disclosure, upon collection of the trajectory data, the trajectory data is modeled in a new 3D space to construct the trajectory flow map layer, the travel direction map layer, and the moving speed map layer, for example, the trajectory data is modeled as new 3D space data in three dimensions of flow, speed, and direction; and then, a fused feature map layer is formed using a multi-channel map layer fusion technique and visualization analysis is performed on the fused feature map layer.

That is, the embodiments of the present disclosure make a comprehensive consideration of attribute information of multiple dimensions including the trajectory flow, the moving speed, and the travel direction in a trajectory modeling phase by means of multi-channel feature fusion, which effectively preserves important feature information implied in the trajectory data, for example, spatio-temporal information and related attributes. On this basis, on one hand, the embodiments of the present disclosure can mine the motion mode of the moving object in the real world with enhanced precision, for example, it can extract the real motion attribute, can form an integrated trajectory modeling frame of time, geography, and trajectory 3D visualization, and can be used for researching a moving object theory and used as a real data set; on the other hand, the embodiments of the present disclosure facilitate expanding and enriching the subsequent trajectory mining, and provide a technical basis for implementing simple, efficient, active, and intelligent trajectory information mining in the road network update system.

In another expression way, the embodiments of the present disclosure can not only mine the motion mode of the moving object in the real world with enhanced precision, but also improve the subsequent trajectory mining effect based on the massive trajectory data.

In addition, after displaying the fused feature map layer, in response to obtaining a selection instruction of any pixel position on the fused feature map layer, the trajectory flow at the pixel position and the moving speed and the travel direction of the moving object at the pixel position can also be intuitively displayed, for example, the embodiments of the present disclosure can intuitively analyze the trajectory flow at each pixel position, and the moving speed and the travel direction of the moving object at the pixel position, and the effect is better.

Figure 16:
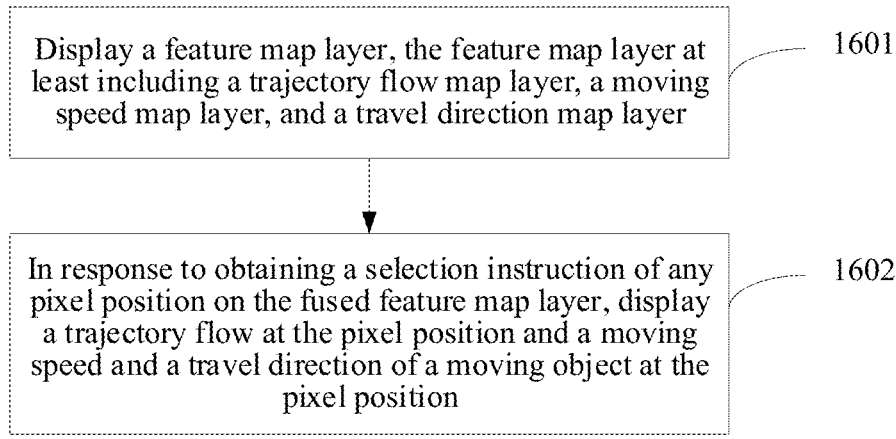
FIG. 16 is a schematic flowchart of a trajectory data processing method according to one or more embodiments of the present disclosure.

In another embodiment, the trajectory data processing method provided by the embodiments of the present disclosure further includes the method flow shown in FIG. 16:

1601: Display a feature map layer, the feature map layer at least including a trajectory flow map layer, a moving speed map layer, and a travel direction map layer.

The feature map layer in this step refers to the foregoing fused feature map layer, for example, the feature map layer in this step is a fusion result of the map layers included in the feature map layer of the trajectory data; and each map layer at least includes the trajectory flow map layer, the moving speed map layer, and the travel direction map layer.

The fused feature map layer in this step is the feature map layer obtained through the fusion processing in step 4034 above. That is, after the trajectory data in the target geographical range is obtained, the feature map layer of the trajectory data is generated, and the fused feature map layer above is obtained by fusing map layers in the feature map layer. The trajectory data includes moving trajectories of a plurality of moving objects.

In certain embodiments, referring to FIG. 3 and FIG. 13, in the fused feature map layer, different colors may respectively represent the trajectory flow, the moving speed, and the travel direction. For example, the embodiments of the present disclosure adopt red R to represent the trajectory flow, green G to represent the moving speed, and blue B to represent the travel direction.

When or in response to determining the fused feature map layer is displayed, functions provided by interface elements include, but are not limited to, positions, sizes, colors, feature exhibition, and the like. Position refers to intuitively displaying the flow feature, the speed feature, and the direction feature at the pixel position in response to obtaining the selection instruction for any pixel position in the fused feature map layer. Size refers to a fused feature map layer corresponding to the foregoing grid region. Color refers to RGB components; as stated above, R represents flow, G represents speed, and B represents direction. Feature display is displaying the flow feature, the speed feature, and the direction feature at the corresponding pixel position.

1602: In response to obtaining a selection instruction of any pixel position on the fused feature map layer, display a trajectory flow at the pixel position and a moving speed and a travel direction of a moving object at the pixel position.

In certain embodiments, the trajectory flow at the pixel position and the moving speed and the travel direction of the moving object at the pixel position include, but are not limited to: superimposing and displaying a feature display map layer on the feature map layer; and displaying, on the feature display map layer, the trajectory flow at the pixel position and the moving speed and the travel direction of the moving object at the pixel position.

Taking FIG. 13 as an example, for each pixel position, different colors intuitively represent different travel situations in the real world; as shown in FIG. 13, three components, R, G, and B, at a specified pixel position where a cursor is located are respectively 207, 96, and 155; the historical trajectory flow corresponding to the pixel position is 3970 trajectories; the historical average moving speed of the vehicle is 59.03 km/h, and an included angle between the travel direction and the due north is 311.13 degrees.

In addition, the right drawing in FIG. 12 is compared with FIG. 13, the fused feature map layer can be locally enlarged for displaying; the embodiment of the present disclosure does not specifically limit same.

The method provided by the embodiments of the present disclosure can perform visualization analysis on the trajectory data, for example, after displaying the feature map layer, in response to obtaining a selection instruction of any pixel position on the feature map layer, the trajectory flow at the pixel position and the moving speed and the travel direction of the moving object at the pixel position can be intuitively displayed, for example, the embodiments of the present disclosure can perform intuitive analysis on the flow feature, the speed feature, and the direction feature at each pixel position, and the effect is better.

In another embodiment, besides the processing of the trajectory data using the above-described way, the following processing way can also be used:

(a) The embodiments of the present disclosure directly model for the collected massive moving trajectories, while in some trajectory mining scenes, a specific time period may need to be noticed. Therefore, the embodiments of the present disclosure can also be expanded to respectively modeling the massive moving trajectories in different time periods.

(b) During modeling the massive moving trajectories, the embodiments of the present disclosure consider features including flow, speed, and direction, and subsequently, more features can also be added, which is not specifically limited in the embodiments of the present disclosure.

(c) During multi-feature map layer construction, the processing way for each feature map layer is not unique; besides the preceding feature processing ways, self-adaptive adjustments can be made according to actual implementation requirements; and other feature processing ways can be adopted, which is not specifically limited in the embodiments of the present disclosure.

(d) In the process of visualization analysis, more analysis elements can also be added, such as surrounding average moving speed distribution and flow distribution, which is not specifically limited in the embodiments of the present disclosure.

Figure 17:
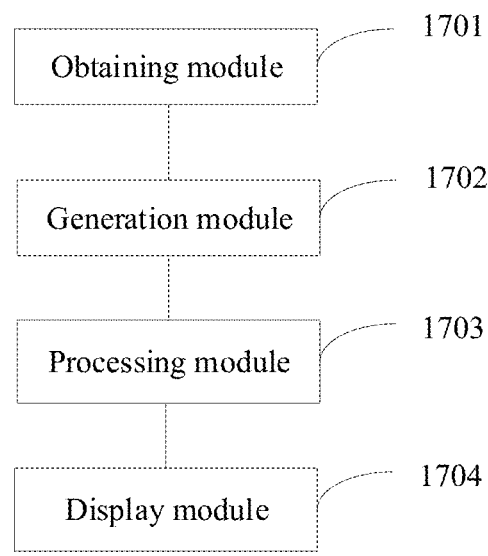
FIG. 17 is a schematic structural diagram of a trajectory data processing apparatus according to one or more embodiments of the present disclosure.

FIG. 17 is a schematic structural diagram of a trajectory data processing apparatus according to an embodiment of the present disclosure. Referring to FIG. 17, the apparatus includes: an obtaining module 1701, configured to obtain trajectory data in a target geographical range, the trajectory data including moving trajectories of a plurality of moving objects; a generation module 1702, configured to generate a feature map layer of the trajectory data, the feature map layer at least including a trajectory flow map layer, a moving speed map layer, and a travel direction map layer; a processing module 1703, configured to fuse map layers in the feature map layer to obtain a fused feature map layer; a display module 1704, configured to display the fused feature map layer; and in response to obtaining a selection instruction of any pixel position on the fused feature map layer, display a trajectory flow at the pixel position and a moving speed and a travel direction of a moving object at the pixel position.

For the apparatus provided by the embodiments of the present disclosure, after the trajectory data in the target geographical range is obtained, the feature map layer of the trajectory data is first generated, where the feature map layer at least includes a trajectory flow map layer, a moving speed map layer, and a travel direction map layer, that is, the embodiments of the present disclosure relate to modeling the trajectory data in a new 3D space, for example, the trajectory data is modeled as new 3D space data in three dimensions of flow, speed, and direction; and the map layers are then fused to form a fused feature map layer and visualization analysis is further performed on the fused feature map layer.

That is, the embodiments of the present disclosure make a comprehensive consideration of attribute information of multiple dimensions including trajectory flow, moving speed, and travel direction in a trajectory modeling phase by means of multi-channel feature fusion, which effectively preserves important feature information implied in the trajectory data, and therefore, the embodiments of the present disclosure not only can mine a motion mode of the moving object in the real world with enhanced precision, but also can improve a subsequent trajectory mining effect.

In addition, after the fused feature map layer is displayed, in response to obtaining a selection instruction of any pixel position on the fused feature map layer, the trajectory flow at the pixel position and the moving speed and the travel direction of the moving object at the pixel position can also be intuitively displayed, for example, the embodiments of the present disclosure can perform intuitive analysis on the trajectory flow at each pixel position and the moving speed and the travel direction of the moving object at the pixel position, and the effect is better.

In certain embodiments, the display module is configured to superimpose and display a feature display map layer on the feature map layer; and display, on the feature display map layer, the trajectory flow at the pixel position and the moving speed and the travel direction of the moving object at the pixel position.

In certain embodiments, the apparatus further includes: a scaling module, configured to respectively scale each grid region into a trajectory image with a uniform size; and a conversion module, configured to, perform, for any grid region, coordinate system conversion on each moving trajectory included in each grid region, to obtain a pixel position of each sampling point on each moving trajectory in a corresponding trajectory image; where the grid region is obtained by spatially splitting the target geographical range, and each moving trajectory included in the trajectory data is divided according to the grid region to which the moving trajectory belongs.

In certain embodiments, the conversion module is configured to obtain longitude and latitude coordinates of a region boundary of the grid region; obtain a height value and a width value of a corresponding trajectory image; for any sampling point, obtain a horizontal axis coordinate of the sampling point in the corresponding trajectory image according to longitude and latitude coordinates of left and right boundaries of the grid region, the width value, and a longitude coordinate of the sampling point; and obtain a longitudinal axis coordinate of the sampling point in the corresponding trajectory image according to longitude and latitude coordinates of upper and lower boundaries of the grid region, the height value, and a latitude coordinate of the sampling point.

In certain embodiments, in response to the feature map layer including the trajectory flow map layer, the generation module is configured to, detect, for each pixel position in any trajectory image, based on a corresponding pixel position of each sampling point on each moving trajectory included in a corresponding grid region in the trajectory image, whether each of the moving trajectories is intersected with the pixel position; and when or in response to determining one of the moving trajectories is intersected with the pixel position, add one to a trajectory flow at the pixel position; where the trajectory flow map layer includes a trajectory flow of each pixel position in the trajectory image.

In certain embodiments, in response to the feature map layer including the moving speed map layer, the generation module is further configured to, detect, for each pixel position in any trajectory image, based on a corresponding pixel position of each sampling point on each moving trajectory included in a corresponding grid region in the trajectory image, whether each of the moving trajectories is intersected with the pixel position; when or in response to determining one of the moving trajectories is intersected with the pixel position, accumulate the moving speeds of the sampling points having the pixel position on the moving trajectory; obtain an average moving speed based on a total number of the accumulated sampling points and a sum of the accumulated moving speeds; and in response to the average moving speed being smaller than a speed threshold, use the average moving speed as a moving speed of a moving object at the pixel position; where the moving speed map layer includes the moving speed of the moving object at each pixel position in the trajectory image.

In certain embodiments, in response to the feature map layer including the travel direction map layer, the generation module is further configured to, detect, for each pixel position in any trajectory image, based on a corresponding pixel position of each sampling point on each moving trajectory included in a corresponding grid region in the trajectory image, whether each of the moving trajectories is intersected with the pixel position; and when or in response to determining one of the moving trajectories is intersected with the pixel position, accumulate vector directions of the sampling points having the pixel position on the moving trajectory; where the travel direction map layer includes a vector direction of each pixel position in the trajectory image, and the vector direction represents a travel direction of a moving object.

In certain embodiments, the display module is configured to display a historical trajectory flow at a geographical position corresponding to the pixel position and a historical average moving speed and a historical travel direction of the moving object at the geographical position corresponding to the pixel position.

In certain embodiments, the processing module is configured to perform flow feature processing on the trajectory flow map layer, to obtain a first feature map layer; project the moving speed of the moving speed map layer in a directional space based on the travel direction map layer, to obtain a second feature map layer; and splice and combine the first feature map layer and the second feature map layer to obtain the fused feature map layer; where the first feature map layer and the second feature map layer have the same value space.

In certain embodiments, the processing module is configured to obtain a flow value upper limit, a first smoothing factor, and a second smoothing factor; obtain a maximum trajectory flow in the trajectory flow map layer; and for any pixel position in the trajectory flow map layer, obtain the trajectory flow of the pixel position again based on the trajectory flow of the pixel position, the first smoothing factor, the second smoothing factor, the maximum trajectory flow, and the flow value upper limit.

In certain embodiments, the processing module is configured to, obtain, for any pixel position, the moving speed of the moving object at the pixel position in the moving speed map layer; obtain a vector direction of the moving object at the pixel position in the travel direction map layer; use a product of the moving speed and a sine value of the vector direction as a moving speed of the pixel position at a longitudinal axis direction; and use a product of the moving speed and a cosine value of the vector direction as a moving speed of the pixel position at a horizontal axis direction.

In certain embodiments, the apparatus further includes: a pre-processing module, configured to, pre-process the trajectory data after obtaining the trajectory data; where the pre-processing includes at least one of the following steps: splitting the target geographical range into a plurality of grid regions according to spaces, and dividing each moving trajectory included in the trajectory data according to the grid region to which the moving trajectory belongs; filtering, according to a set filter condition, each moving trajectory included in the trajectory data; performing abnormality elimination processing on each moving trajectory included in the trajectory data; and performing data interpolation processing on each moving trajectory included in the trajectory data.

Any combination of the foregoing technical solutions may be used to form certain embodiments of the present disclosure. Details are not described herein again.

Figure 18:
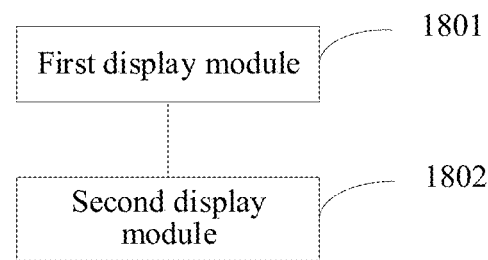
FIG. 18 is a schematic structural diagram of a trajectory data processing apparatus according to one or more embodiments of the present disclosure.

FIG. 18 is a schematic structural diagram of a trajectory data processing apparatus according to an embodiment of the present disclosure. Referring to FIG. 18, the apparatus includes: a first display module 1801, configured to display a feature map layer, the feature map layer at least including a trajectory flow map layer, a moving speed map layer, and a travel direction map layer; and a second display module 1802, configured to display, in response to obtaining a selection instruction of any pixel position on the feature map layer, a trajectory flow at the pixel position and a moving speed and a travel direction of a moving object at the pixel position.

The apparatus provided by the embodiments of the present disclosure can perform visualization analysis on the trajectory data, for example, after the feature map layer is displayed, in response to obtaining a selection instruction of any pixel position on the feature map layer, the trajectory flow at the pixel position and the moving speed and the travel direction of the moving object can be intuitively displayed, for example, the embodiments of the present disclosure can perform intuitive analysis on the flow feature, the speed feature, and the direction feature at each pixel position, and the effect is better.

In certain embodiments, in the feature map layer, different colors respectively represent the trajectory flow, the moving speed, and the travel direction.

In certain embodiments, the second display module is further configured to superimpose and display a feature display map layer on the feature map layer; and display, on the feature display map layer, the trajectory flow at the pixel position and the moving speed and the travel direction of the moving object.

Any combination of the foregoing technical solutions may be used to form certain embodiments of the present disclosure. Details are not described herein again.

When the trajectory data processing apparatus provided in the foregoing embodiment processes trajectory data, only divisions of the foregoing functional modules are described by using an example. During actual implementation, the foregoing functions may be allocated to and performed by different functional modules according to requirements, that is, the internal structure of the apparatus is divided into different functional modules, to perform all or some of the foregoing described functions. In addition, the trajectory data processing apparatus provided in the foregoing embodiments belong to the same idea as the trajectory data processing method embodiment. For a specific implementation thereof, reference may be made to the method embodiment, and details are not described herein again.

Figure 19:
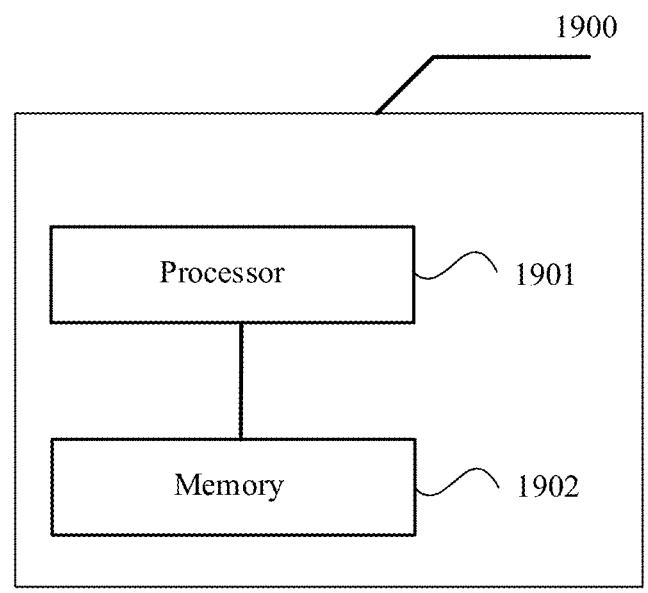
FIG. 19 is a schematic structural diagram of a trajectory data processing device according to one or more embodiments of the present disclosure.

FIG. 19 is a schematic structural diagram of a trajectory data processing device according to an embodiment of the present disclosure.

The device 1900 may vary greatly due to different configurations or performance, and may include one or more processors (such as central processing units (CPUs)) 1901 and one or more memories 1902. The memory 1902 stores at least one instruction, the at least one instruction being loaded and executed by the processor 1901 to implement the trajectory data processing methods provided in the foregoing method embodiments. In certain embodiments, the device may further have components such as a wired or wireless network interface, a keyboard, and an input/output interface for input/output. The device may further include other components for implementing device functions. Details are not described herein again.

In an exemplary embodiment, a computer-readable storage medium, for example, a memory including instructions, is further provided. The instructions may be executed by the processor in the terminal to implement the trajectory data processing method in the foregoing embodiment. For example, the computer readable storage medium may be a read-only memory (ROM), a random access memory (RAM), a compact disc read-only memory (CD-ROM), a magnetic tape, a floppy disk, an optical data storage device, and the like.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

A person of ordinary skill in the art may understand that all or some of the steps of the embodiments may be implemented by hardware, or may be implemented by a program instructing related hardware. The program may be stored in a computer-readable storage medium. The storage medium mentioned above may be a ROM, a magnetic disk, or an optical disc.

The foregoing descriptions are merely exemplary embodiments of the present disclosure, but are not intended to limit the present disclosure. Any modification, equivalent replacement, or improvement and the like made within the spirit and principle of the present disclosure shall fall within the protection scope of the present disclosure.

What is claimed is:

1. A trajectory data processing method, applied to a trajectory data processing device, and the method comprising:
   obtaining trajectory data in a target geographical range, the trajectory data including moving trajectories of a plurality of moving objects;
   respectively scaling a plurality of grid regions into a trajectory image with a uniform size, wherein the grid regions are obtained by spatially splitting the target geographical range, and the moving trajectories are respectively divided according to the grid regions to which the moving trajectories belong;
   for a grid region of the plurality of grid regions, obtaining pixel positions of sampling points on each moving trajectory in the trajectory image corresponding to the grid region;
   generating a feature map layer of the trajectory data, the feature map layer at least including a trajectory flow map layer, a moving speed map layer, and a travel direction map layer;
   fusing map layers in the feature map layer to obtain a fused feature map layer;
   displaying the fused feature map layer; and
   in response to obtaining a selection instruction of any pixel position on the fused feature map layer, displaying a trajectory flow at the pixel position and a moving speed and a travel direction of a moving object at the pixel position,
   wherein generating the feature map layer comprises:
      for a target pixel position in a trajectory image, based on the pixel positions of the sampling points on each moving trajectory included in a corresponding grid region in the trajectory image, detecting whether each of the moving trajectories is intersected with the target pixel position; and
      in response to determining one of the moving trajectories being intersected with the target pixel position, determining at least one of a trajectory flow at the target pixel position, a moving speed of a target moving object at the target pixel position, or a vector direction of the target pixel position;
      wherein the trajectory flow map layer comprises the trajectory flow of the target pixel position in the trajectory image, the moving speed map layer comprises the moving speed of the target moving object at the target pixel position in the trajectory image, and the travel direction map layer comprises the vector direction of the target pixel position in the trajectory image, the vector direction representing the travel direction of the target moving object.

2. The method according to claim 1, wherein displaying the trajectory flow comprises:
   superimposing and displaying a feature display map layer on the fused feature map layer; and displaying, on the feature display map layer, the trajectory flow at the pixel position and the moving speed and the travel direction of the moving object at the pixel position.

3. The method according to claim 1, wherein obtaining pixel positions of sampling points on each moving trajectory in the trajectory image corresponding to the grid region comprises:
performing coordinate system conversion on each moving trajectory comprised in the grid region, to obtain a pixel position of each sampling point on each moving trajectory in a corresponding trajectory image.

4. The method according to claim 1, wherein performing the coordinate system conversion comprises:
obtaining longitude and latitude coordinates of a region boundary of the grid region;
obtaining a height value and a width value of a corresponding trajectory image;
for any sampling point, obtaining a horizontal axis coordinate of the sampling point in the corresponding trajectory image according to longitude and latitude coordinates of left and right boundaries of the grid region, the width value, and a longitude coordinate of the sampling point; and
obtaining a longitudinal axis coordinate of the sampling point in the corresponding trajectory image according to longitude and latitude coordinates of upper and lower boundaries of the grid region, the height value, and a latitude coordinate of the sampling point.

5. The method according to claim 1, wherein generating the feature map layer of the trajectory data comprises:
in response to determining one of the moving trajectories is intersected with the target pixel position, adding one to a trajectory flow at the target pixel position.

6. The method according to claim 1, wherein generating the feature map layer of the trajectory data comprises:
in response to determining one of the moving trajectories is intersected with the target pixel position, accumulating the moving speeds of the sampling points having the pixel position on the moving trajectory;
obtaining an average moving speed based on a total number of the accumulated sampling points and a sum of the accumulated moving speeds; and
in response to the average moving speed being smaller than a speed threshold, using the average moving speed as a moving speed of a moving object at the target pixel position.

7. The method according to claim 1, wherein generating the feature map layer of the trajectory data comprises:
in response to determining one of the moving trajectories is intersected with the target pixel position, accumulating vector directions of the sampling points having the pixel position on the moving trajectory.

8. The method according to claim 1, wherein fusing the map layers in the feature map layer to obtain the fused feature map layer comprises:
performing flow feature processing on the trajectory flow map layer, to obtain a first feature map layer;
projecting the moving speed of the moving speed map layer in a directional space based on the travel direction map layer, to obtain a second feature map layer; and
splicing and combining the first feature map layer and the second feature map layer to obtain the fused feature map layer;
wherein the first feature map layer and the second feature map layer have the same value space.

9. The method according to claim 8, wherein performing the flow feature processing on the trajectory flow map layer comprises:
obtaining a flow value upper limit, a first smoothing factor, and a second smoothing factor;
obtaining a maximum trajectory flow in the trajectory flow map layer; and
for any pixel position in the trajectory flow map layer, obtaining the trajectory flow of the pixel position again based on the trajectory flow of the pixel position, the first smoothing factor, the second smoothing factor, the maximum trajectory flow, and the flow value upper limit.

10. The method according to claim 8, wherein projecting the moving speed of the moving speed map layer comprises:
for any pixel position, obtaining, in the moving speed map layer, the moving speed of the moving object at the pixel position;
obtaining a vector direction of the moving object at the pixel position in the travel direction map layer; and
using a product of the moving speed and a sine value of the vector direction as a moving speed of the pixel position in a longitudinal axis direction; and using a product of the moving speed and a cosine value of the vector direction as a moving speed of the pixel position in a horizontal axis direction.

11. The method according to claim 1, wherein displaying the trajectory flow comprises:
displaying a historical trajectory flow at a geographical position corresponding to the pixel position and a historical average moving speed and a historical travel direction of the moving object at the geographical position corresponding to the pixel position.

12. The method according to claim 1, further comprising:
after obtaining the trajectory data, pre-processing the trajectory data;
wherein the pre-processing comprises one or more of:
filtering, according to a filter condition, each moving trajectory comprised in the trajectory data;
performing abnormality elimination processing on each moving trajectory included in the trajectory data; or
performing data interpolation processing on each moving trajectory included in the trajectory data.

13. A trajectory data processing device, comprising: a processor and a memory, the memory storing at least one instruction; and the at least one instruction being executed by the processor to perform:
obtaining trajectory data in a target geographical range, the trajectory data including moving trajectories of a plurality of moving objects;
respectively scaling a plurality of grid regions into a trajectory image with a uniform size, wherein the grid regions are obtained by spatially splitting the target geographical range, and the moving trajectories are respectively divided according to the grid regions to which the moving trajectories belong;
for a grid region of the plurality of grid regions, obtaining pixel positions of sampling points on each moving trajectory in the trajectory image corresponding to the grid region;
generating a feature map layer of the trajectory data, the feature map layer at least including a trajectory flow map layer, a moving speed map layer, and a travel direction map layer;
fusing map layers in the feature map layer to obtain a fused feature map layer;
displaying the fused feature map layer; and in response to obtaining a selection instruction of any pixel position on the fused feature map layer, displaying a trajectory flow at the pixel position and a moving speed and a travel direction of a moving object at the pixel position, wherein generating the feature map layer comprises:
for a target pixel position in a trajectory image, based on the pixel positions of the sampling points on each moving trajectory included in a corresponding grid region in the trajectory image, detecting whether each of the moving trajectories is intersected with the target pixel position; and in response to determining one of the moving trajectories being intersected with the target pixel position, determining at least one of a trajectory flow at the target pixel position, a moving speed of a target moving object at the target pixel position, or a vector direction of the target pixel position;

wherein the trajectory flow map layer comprises the trajectory flow of the target pixel position in the trajectory image, the moving speed map layer comprises the moving speed of the target moving object at the target pixel position in the trajectory image, and the travel direction map layer comprises the vector direction of the target pixel position in the trajectory image, the vector direction representing the travel direction of the target moving object.

14. The device according to claim 13, wherein the at least one instruction is executed by the processor to further perform:
superimposing and displaying a feature display map layer on the fused feature map layer; and
displaying, on the feature display map layer, the trajectory flow at the pixel position and the moving speed and the travel direction of the moving object at the pixel position.

15. The device according to claim 13, wherein obtaining pixel positions of sampling points on each moving trajectory in the trajectory image corresponding to the grid region comprises:
performing coordinate system conversion on each moving trajectory included in the grid region, to obtain a pixel position of each sampling point on each moving trajectory in a corresponding trajectory image.

16. The device according to claim 13, wherein the at least one instruction is executed by the processor to perform:
obtaining longitude and latitude coordinates of a region boundary of the grid region;
obtaining a height value and a width value of a corresponding trajectory image;
for any sampling point, obtaining a horizontal axis coordinate of the sampling point in the corresponding trajectory image according to longitude and latitude coordinates of left and right boundaries of the grid region, the width value, and a longitude coordinate of the sampling point; and
obtaining a longitudinal axis coordinate of the sampling point in the corresponding trajectory image according to longitude and latitude coordinates of upper and lower boundaries of the grid region, the height value, and a latitude coordinate of the sampling point.

17. The device according to claim 13, wherein the at least one instruction is executed by the processor to perform:
in response to determining one of the moving trajectories is intersected with the target pixel position, adding one to a trajectory flow at the target pixel position.

18. The device according to claim 13, wherein the at least one instruction is executed by the processor to further perform:
in response to determining one of the moving trajectories is intersected with the target pixel position, accumulating the moving speeds of the sampling points having the pixel position on the moving trajectory;
obtaining an average moving speed based on a total number of the accumulated sampling points and a sum of the accumulated moving speeds; and
in response to the average moving speed being smaller than a speed threshold, using the average moving speed as a moving speed of a moving object at the target pixel position.

19. The device according to claim 13, wherein the at least one instruction is executed by the processor to further perform:
in response to determining one of the moving trajectories is intersected with the target pixel position, accumulating vector directions of the sampling points having the pixel position on the moving trajectory.

20. A non-transitory storage medium, storing at least one instruction; the at least one instruction being executed by a processor to perform:
obtaining trajectory data in a target geographical range, the trajectory data including moving trajectories of a plurality of moving objects;
respectively scaling a plurality of grid regions into a trajectory image with a uniform size, wherein the grid regions are obtained by spatially splitting the target geographical range, and the moving trajectories are respectively divided according to the grid regions to which the moving trajectories belong;
for a grid region of the plurality of grid regions, obtaining pixel positions of sampling points on each moving trajectory in the trajectory image corresponding to the grid region;
generating a feature map layer of the trajectory data, the feature map layer at least including a trajectory flow map layer, a moving speed map layer, and a travel direction map layer;
fusing map layers in the feature map layer to obtain a fused feature map layer;
displaying the fused feature map layer; and
in response to obtaining a selection instruction of any pixel position on the fused feature map layer, displaying a trajectory flow at the pixel position and a moving speed and a travel direction of a moving object at the pixel position, wherein generating the feature map layer comprises:
for a target pixel position in a trajectory image, based on the pixel positions of the sampling points on each moving trajectory included in a corresponding grid region in the trajectory image, detecting whether each of the moving trajectories is intersected with the target pixel position; and in response to determining one of the moving trajectories being intersected with the target pixel position, determining at least one of a trajectory flow at the target pixel position, a moving speed of a target moving object at the target pixel position, or a vector direction of the target pixel position;

wherein the trajectory flow map layer comprises the trajectory flow of the target pixel position in the trajectory image, the moving speed map layer comprises the moving speed of the target moving object at the target pixel position in the trajectory image, and the travel direction map layer comprises the vector direction of the target pixel position in the trajectory image, the vector direction representing the travel direction of the target moving object.

* * * * *